(12) United States Patent
Tipparaju

(10) Patent No.: US 11,882,399 B2
(45) Date of Patent: Jan. 23, 2024

(54) ACOUSTIC REFLECTOR FOR HEIGHT CHANNEL SPEAKER

(71) Applicant: Dolby Laboratories Licensing Corporation, San Francisco, CA (US)

(72) Inventor: Lakshmikanth Tipparaju, South San Francisco, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 192 days.

(21) Appl. No.: 17/434,395

(22) PCT Filed: Feb. 24, 2020

(86) PCT No.: PCT/US2020/019523
§ 371 (c)(1),
(2) Date: Aug. 26, 2021

(87) PCT Pub. No.: WO2020/176421
PCT Pub. Date: Sep. 3, 2020

(65) Prior Publication Data
US 2022/0394377 A1    Dec. 8, 2022

Related U.S. Application Data

(60) Provisional application No. 62/932,135, filed on Nov. 7, 2019, provisional application No. 62/811,371, filed on Feb. 27, 2019.

(51) Int. Cl.
*H04R 1/34* (2006.01)

(52) U.S. Cl.
CPC .................................. *H04R 1/345* (2013.01)

(58) Field of Classification Search
CPC .............................................. H04R 1/345
USPC ............................................... 381/160
See application file for complete search history.

(56) References Cited

U.S. PATENT DOCUMENTS

| | | |
|---|---|---|
| 2004/0190746 A1 | 9/2004 | Seki |
| 2010/0290659 A1 | 11/2010 | Tagami |
| 2014/0226840 A1 | 8/2014 | Weiss |
| 2015/0053497 A1 | 2/2015 | Horiuchi |
| 2015/0350804 A1 | 12/2015 | Crockett |
| 2016/0180831 A1 | 6/2016 | Boden |
| 2016/0219364 A1 | 7/2016 | Seefeldt |
| 2017/0070837 A1 | 3/2017 | De Poortere |
| 2018/0184202 A1 | 6/2018 | Walther |

*Primary Examiner* — Sean H Nguyen

(57) ABSTRACT

A height channel speaker with an integrated acoustic reflector to reflect sound off of a ceiling down to a listener. The acoustic reflector compensates for thin transducers by creating a virtual image of the real sound source outside the speaker enclosure. The focal point of the acoustic reflector is controlled by modifying the curvature of the reflector surface. The transducer is mounted on an inclined plane to radiate sound in a rear-upward inclined direction. The acoustic reflector is mounted on the same inclined plane so that the radiant axis of the transducer is directly incident on the acoustic reflector surface. The sound is projected towards the ceiling in a forward, upward-inclined direction to reflect off the ceiling and down to the listener. The speaker can be acoustically occluded from the listener by a panel to which the speaker is attached.

19 Claims, 20 Drawing Sheets

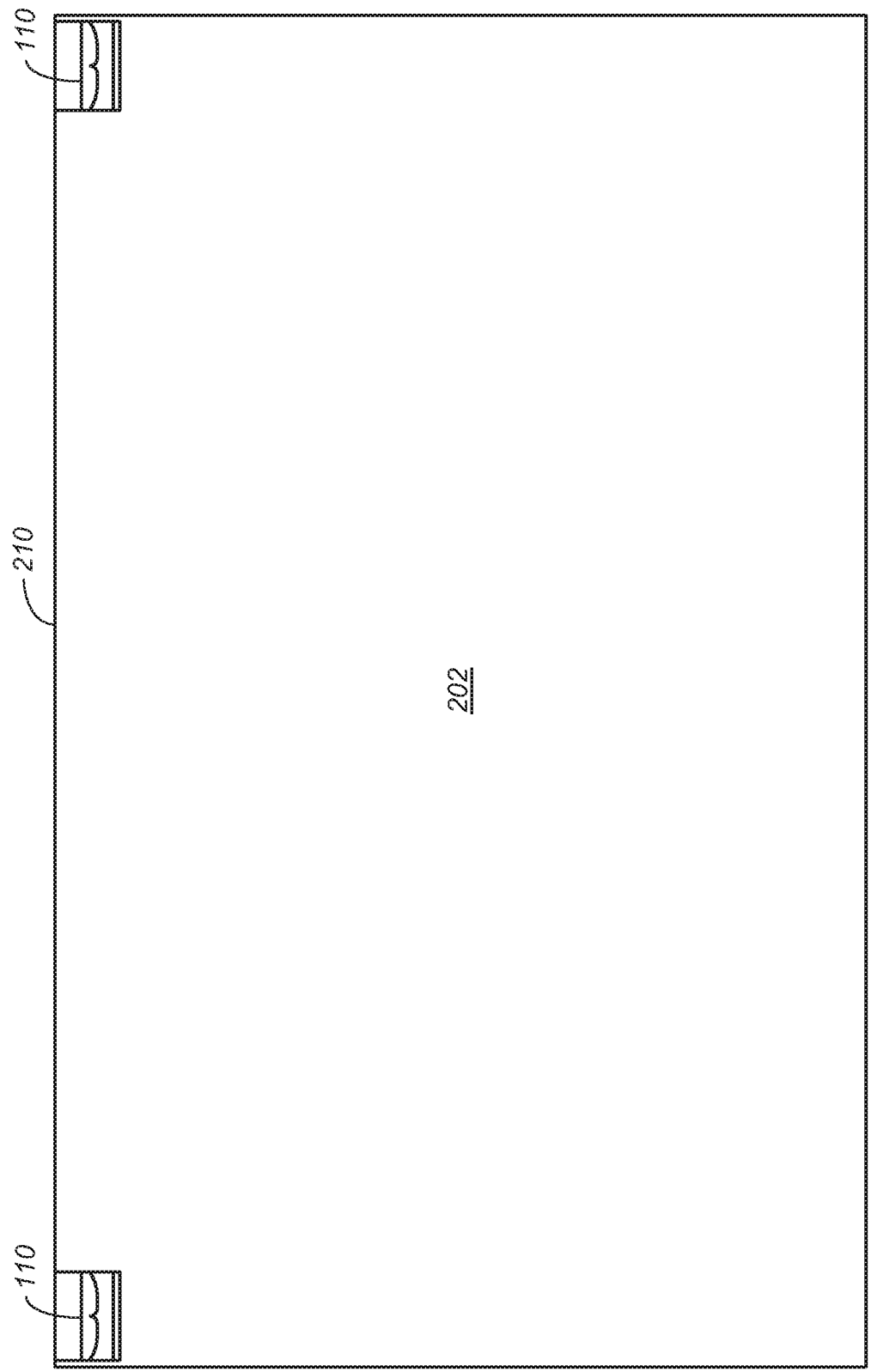

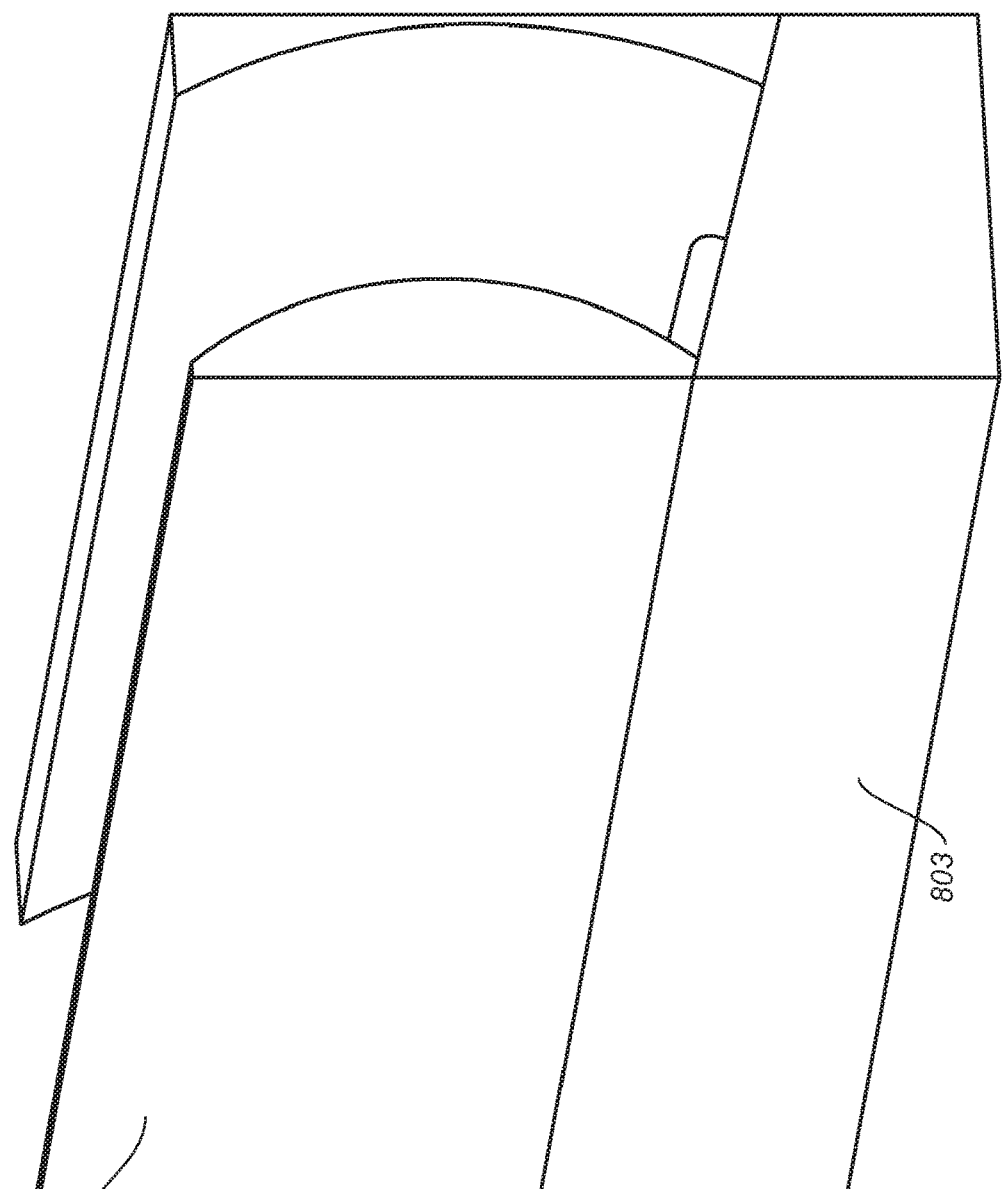
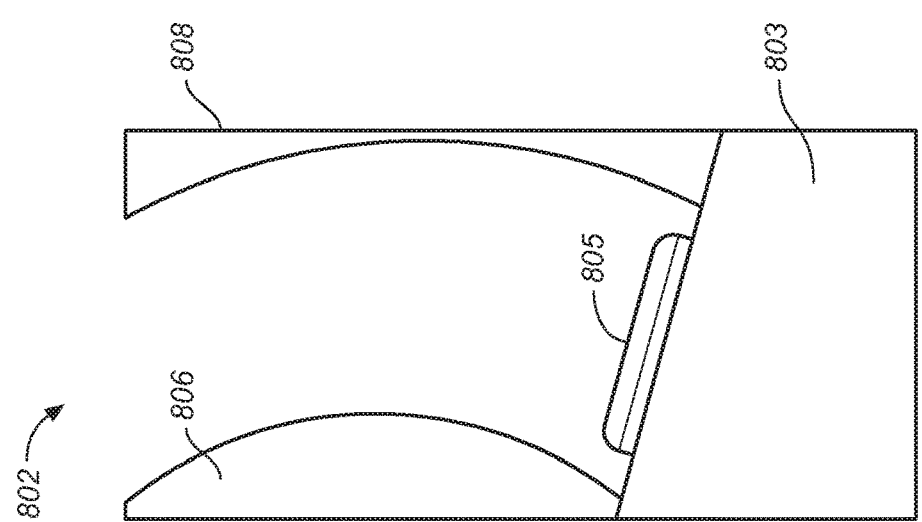
FIG. 8B
FIG. 8A

ACOUSTIC REFLECTOR FOR HEIGHT CHANNEL SPEAKER

CROSS-REFERENCE TO RELATED APPLICATIONS

This application claims priority to U.S. Provisional Patent Application No. 62/811,371, filed Feb. 27, 2019 and U.S. Provisional Patent Application No. 62/932,135, filed Nov. 7, 2019, each of which is hereby incorporated by reference in its entirety.

TECHNICAL FIELD

One or more implementations relate generally to audio loudspeakers, and more specifically to height channel speakers with integrated acoustic reflectors.

BACKGROUND

Modern audio multi-channel audio content can include height channels for audio sources that are meant to be above a listener. Height channel speakers (also called height speakers or height speaker modules) radiate a majority of their acoustic energy towards the ceiling. By reflecting sound off the ceiling, the height speakers reproduce audio as if the sound source is located in the ceiling.

Home audio/visual (A/V) systems increasingly feature devices that pose significant challenges to audio playback systems. Flat-panel displays, portable and tablet computers, smartphones, miniaturized audio systems, and so on, all constrain the space available to install and house audio speakers. In situations where there are constraints on the physical dimension of the height speaker, such as thickness (or depth), the direct upward firing speaker may not yield a sufficiently effective or desirable height effect. Due to the reduced thickness constraints, the distance between the acoustic center of the transducer and the recessed wall structure (e.g., the TV panel) is significantly reduced when compared to conventional height speakers. This leads to acoustic energy being reflected off the recessed wall structure as opposed to creating sound reflections off the ceiling. This destructive interference minimizes the acoustic energy that reproduces the height channel content and results in listeners perceiving audio as destructive interference from the recessed wall structure, and not as being reflected from above. In addition, a narrow (thin) transducer usually needs to be used in the height speakers in order to meet the thickness limitations. As the far field pressure radiated from the transducer is dependent on the size of the radiating surface of the transducer, the thin height speaker modules have a lower acoustic output and narrower dispersion pattern compared to conventional height speakers. These, and other limitations need to be addressed in order to enhance the upward firing effect for thin transducer speakers, and other similar tranducers used in reflective height channel speakers.

SUMMARY OF EMBODIMENTS

Embodiments are directed to height channel speakers with integrated acoustic reflectors, (also called acoustic lenses) for use with height channel speakers. The acoustic reflector is used to reflect, shape, and focus acoustic energy originating from the height speaker transducer upwards to the ceiling, or similar upper room surface. The acoustic reflector effectively helps to overcome the constrained thickness of the transducer by creating a virtual image of the real sound source outside of the height speaker enclosure (or cabinet). The focal point of the acoustic reflector is controlled by modifying the curvature of the acoustic reflector surface.

The height speaker transducer is mounted on an inclined plane of a speaker cabinet such that the acoustic energy is radiated in a rear-upward-inclined direction. The base portion of the acoustic reflector is mounted on the same inclined plane or on a plane parallel to the transducer mounting plane, such that the radiant axis of the transducer is directly incident on the acoustic reflector surface. The acoustic reflector reflects and focuses a majority of incident sound radiation towards the ceiling in a forward-upward-inclined direction to provide effective audio height cues for audio with height content. Embodiments are yet further directed to methods of making height speakers with integrated reflectors.

The height speaker may be mounted on the rear panel of a television or other playback device such that the panel at least partly occludes the sound transmitted from the height speaker transducer and minimizes any direct sound transmission from the transducer to the listener, thereby focusing all or a majority of the sound to the ceiling for reflection down to the listener.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 2B is a front view of flat panel display of FIG. 2A with attached acoustic reflector height channel speakers.

FIG. 4A illustrates a thickness of an acoustic height channel speaker, FIG. 4B illustrates variables related to a tilt angle of a transducer, and FIG. 4C illustrates variables defining the geometry of the acoustic reflector, under some embodiments.

FIG. 8A illustrates a side view of an acoustic reflector height channel speaker with a two-part curved wall structure for the acoustic reflector, under some embodiments.

FIG. 8B is a front perspective view of the speaker of FIG. 8A, under some embodiments.

DETAILED DESCRIPTION

Figure 1A:
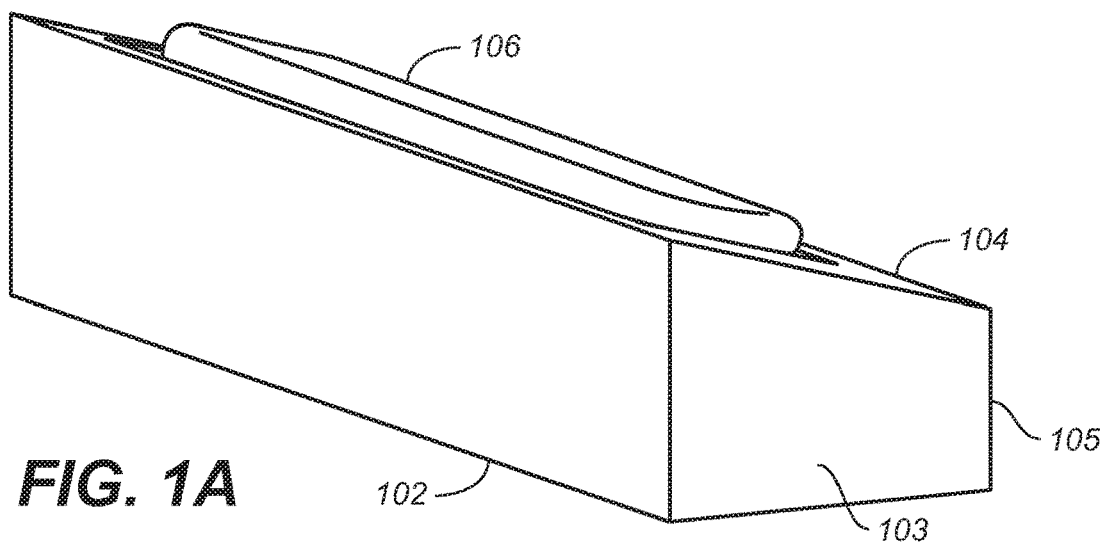
FIG. 1A illustrates an example height speaker module for use with an acoustic reflector, under some embodiments.

Embodiments are directed to an acoustic reflector design for use with or integrated with height channel speakers. Any of the described embodiments may be used alone or together with one another in any combination. Although various embodiments may have been motivated by various deficiencies with the current and known solutions, which may be discussed in the specification, the embodiments do not necessarily address any of these deficiencies. Different embodiments may address different deficiencies, and some may only be partially addressed.

For purposes of the present description, the following terms have the associated meanings: the term "channel" means an audio signal plus metadata in which the position is coded as a channel identifier, e.g., left-front or right-top surround; "channel-based audio" is audio formatted for playback through a pre-defined set of speaker zones with associated nominal locations, e.g., 5.1, 7.1, and so on (i.e., a collection of channels as just defined); the term "object" means one or more audio channels with a parametric source description, such as apparent source position (e.g., 3D coordinates), apparent source width, etc.; "object-based audio" means a collection of objects as just defined; and "immersive audio," (alternately "spatial audio" or "adaptive audio") means channel-based and object or object-based audio signals plus metadata that renders the audio signals based on the playback environment using an audio stream plus metadata in which the position is coded as a 3D position in space; and "listening environment" means any open, partially enclosed, or fully enclosed area, such as a room that can be used for playback of audio content alone or with video or other content, and can be embodied in a home, cinema, theater, auditorium, studio, game console, and the like.

The term "speaker" or "loudspeaker" means an audio playback speaker having a cabinet enclosing one or more drivers, where the term "driver" means an individual audio transducer that converts an electrical audio signal into sound waves, and may be implemented as a cone, horn, microspeaker, or planar driver, and may be a full-range driver or configured to playback a certain frequency range, such as a tweeter, mid-range driver, woofer, sub-woofer, and so on. The term "cabinet" means a speaker enclosure or box that houses the transducer or transducers (or drivers) and that is typically wholly enclosed to acoustically isolate the transducers, but that may also be vented or partially open if required for certain audio response characteristics.

Systems and methods are described for an acoustic reflector design for use or integration with height channel speakers. The transducer (also referred to as a real sound source) of the height channel speaker is typically mounted on a recessed inclined plane of the speaker cabinet such that the radiant axis of the transducer is directly incident on the ceiling. Such a speaker may be referred to as a direct upward firing speaker. These speakers are designed such that the acoustic energy reproducing the height channel content is maximized Depending on the configuration of the speaker and the angle of inclination, there may be both ceiling reflected and direct sound components that reach the listener from a height speaker. To enhance the direct upward firing speaker effect, it is important that the listeners should perceive sound that is reflected from above and not from the speaker itself. Hence, height speakers may use acoustic occlusion to reduce horizontal acoustical leakage towards the listener. Acoustic occlusion may be introduced by recessing the transducer into its mounting plane to physically block sound waves that radiate directly towards the listener. In addition, height cue filters may be applied to the upward firing speakers, to modify the frequency response such that the sound source appears to originate from the ceiling.

In an embodiment, a height firing speaker having a upward tilted transducer includes an acoustic reflector that is used to reflect, shape, and focus acoustic energy transmitted from the speaker transducer upwards to the ceiling or other surface above the listener. The height speaker transducer is mounted on an inclined plane such that the acoustic energy is radiated in a rear-upward-inclined direction. The base portion of the acoustic reflector is mounted on the same inclined plane or a plane parallel to the transducer mounting plane, such that the radiant axis of the transducer is directly incident on the acoustic reflector surface. The acoustic reflector reflects and focuses a majority of incident sound radiation towards the ceiling in a forward-upward-inclined direction to provide reproduce the audio height cues present in the audio signal. The acoustic reflector functions as an acoustic lens creating a virtual image of the real sound source outside of the height speaker cabinet, thereby overcoming possible thickness constraints placed on the transducer, such as when used in flat panel televisions. The geometric relationship between the reflector surface and transducer position in front of the reflector controls how well a virtual image that is equivalent to the real sound source can be created. In addition, the focusing ability of the reflector is characterized by the principal focal point, which is controlled by modifying the curvature of the reflector surface. The farther the focal point, greater is the acoustical sweet spot of the height speaker module. The principal focal point needs to be customized as per the acoustical sweet spot requirement for each product category. For example, the viewer distance for a 65" TV is larger than the viewer distance for a 55" TV. Hence the acoustical design of height speaker module with integrated reflectors may be unique for each product category, where product category may refer to the size and configuration of a playback device having a display panel.

Embodiments are directed to an acoustic reflector design for use with or integrated with height channel speakers. FIG. 1A illustrates an example height speaker module for use with an acoustic reflector, under some embodiments. As shown in FIG. 1A, height speaker 102 includes a cabinet 103 that is typically a closed box, but may instead be or vented box to enhance the low frequency response of the speaker. An upper surface 104 is angled upward and a transducer 106 is mounted to this upper surface 104 to project sound up toward the ceiling of the listening environment. The speaker cabinet 103 may be placed on or parallel to the floor such that angle of the upper surface 104 causes sound to be projected from transducer 106 toward the ceiling at an appropriate angle from the floor plane, such as between 0 degrees to 90 degrees. The transducer 106 may be any appropriate type of driver, such as a tweeter, mid-range, or even a woofer. It may be implemented as a single transducer or an array of transducers. It may also be of any appropriate shape, such as circular or oblong, as shown.

Figure 1B:
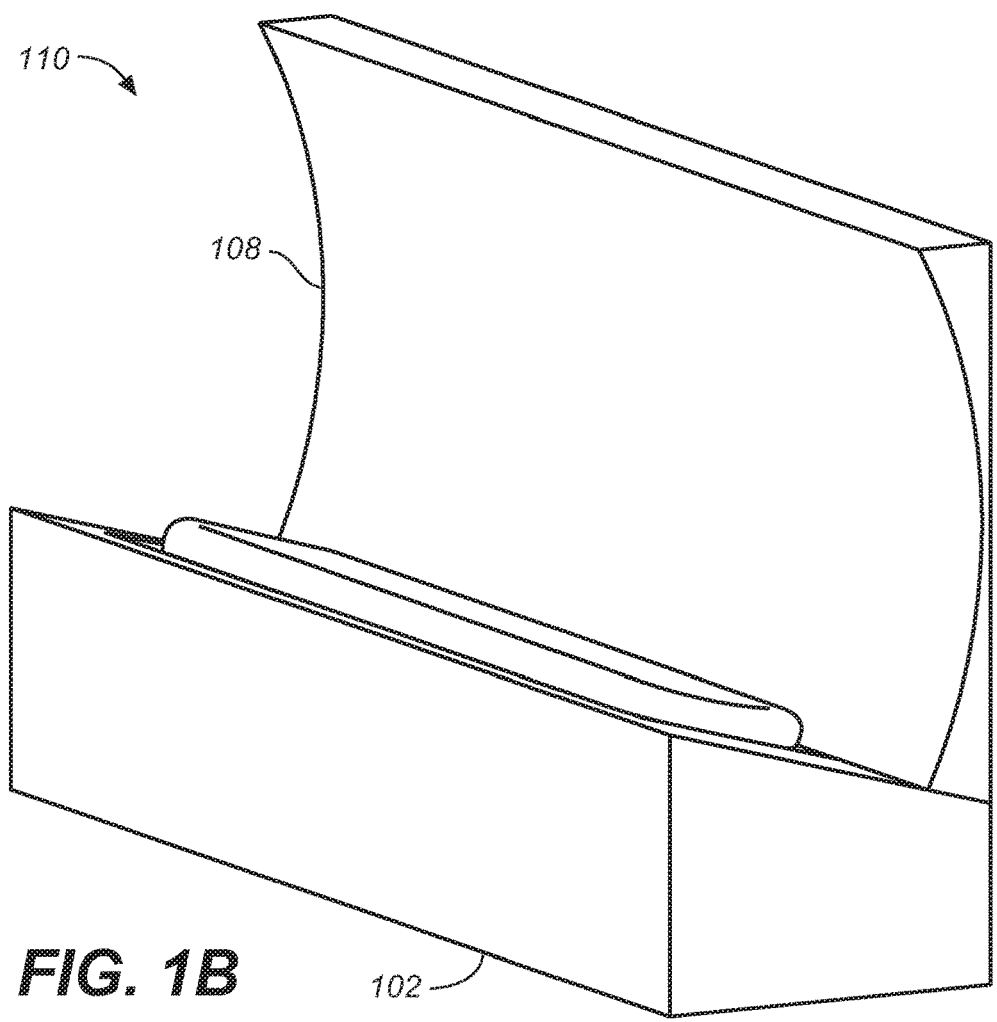
FIG. 1B illustrates an example acoustic reflector incorporated with the height speaker module of FIG. 1A, under some embodiments.

The speaker 102 of FIG. 1A is configured to include or be attached to an acoustic reflector. FIG. 1B illustrates an example acoustic reflector incorporated with the height speaker module of FIG. 1A, under some embodiments. As shown in FIG. 1B, acoustic reflector 108 is attached to the downward or lower side 105 of cabinet 103 such that it extends up from this lower side of the cabinet.

As can be seen in FIG. 1B, the acoustic reflector is configured to reflect, shape, and focus sound waves from the transducer 106 towards the ceiling, or other upper surface of the listening environment. The height speaker transducer 106 is mounted on the inclined plane of the upper surface 104 such that the sound energy is radiated in a rear, upward-inclined direction. The acoustic reflector 108 is mounted on the same inclined plane as the transducer such that the radiant axis of the transducer is directly incident on the inside surface of the acoustic reflector 108. The acoustic reflector reflects, shapes, and focuses a majority of incident sound towards the ceiling in a forward, upward-inclined direction.

The acoustic reflector 108 may be a separate unit that is attached to the height speaker 102 through appropriate means, such as glue, nails, screws, bonding, and so on. Alternatively, it may be a structure that is integrated with or manufactured as part of the speaker cabinet 103. In either case, such a speaker is referred to as an "acoustic reflector height channel speaker" 110, or any equivalent or similar term.

Figure 1C:
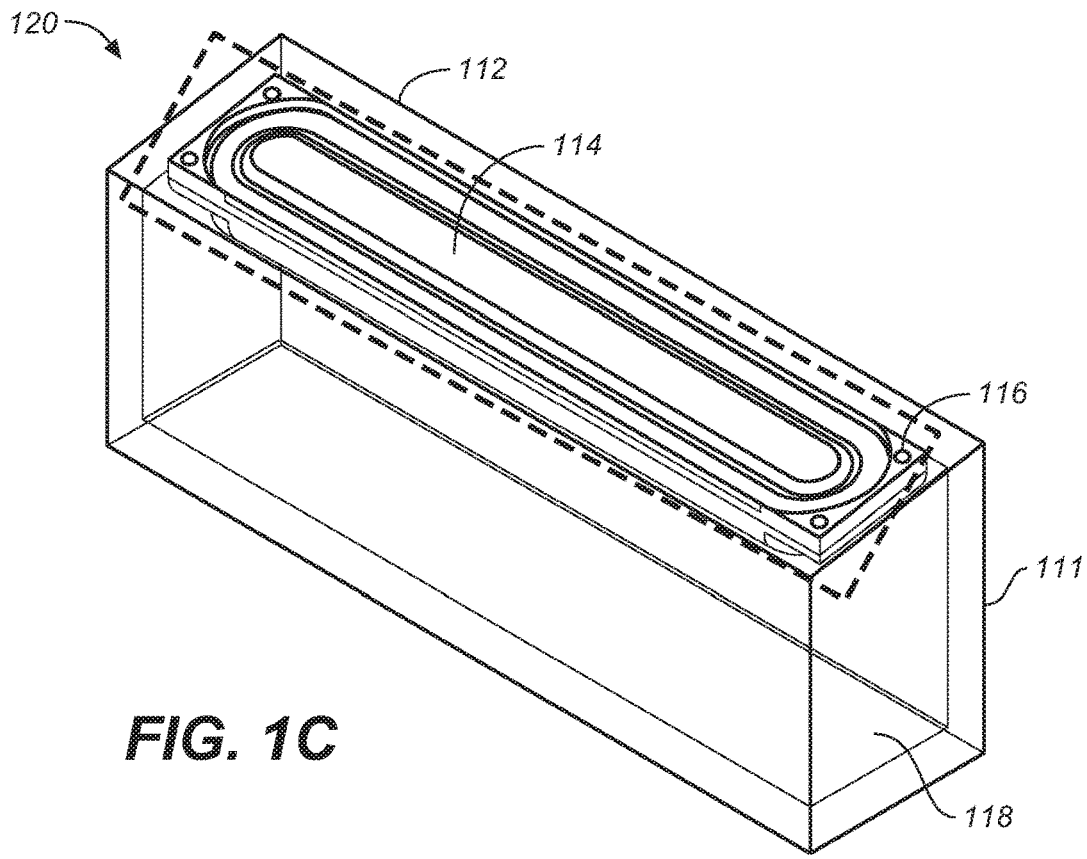
FIG. 1C is a cutaway view of the transducer cabinet of FIG. 1A, under some embodiments.

FIG. 1C is a cutaway view of the transducer cabinet of FIG. 1A, under some embodiments. In FIG. 1C, surface 112 represents the mounting plane of the transducer 114, which may be a thin height speaker transducer having a radiating surface 114. This transducer is coupled to the cabinet 111 by a transducer basket 116. The walls of cabinet 111 define a sealed acoustic back volume 118 when the cabinet is attached to a device or panel along its open end. The dashed line 120 represents the audio projection plane of the height speaker transducer. The transducer radiating surface 114 may be flushly aligned with the transducer basket 116, which in turn is flushly aligned with the radiating surface 112. However, the radiating surface 114 may instead be recessed within or extended above the radiating surface 112, if necessary. The transducer shown in FIG. 1C is an oblong or racetrack shaped transducer, but any other appropriate shape transducer may be used, depending on the configuration of the cabinet 111.

Figure 1D:
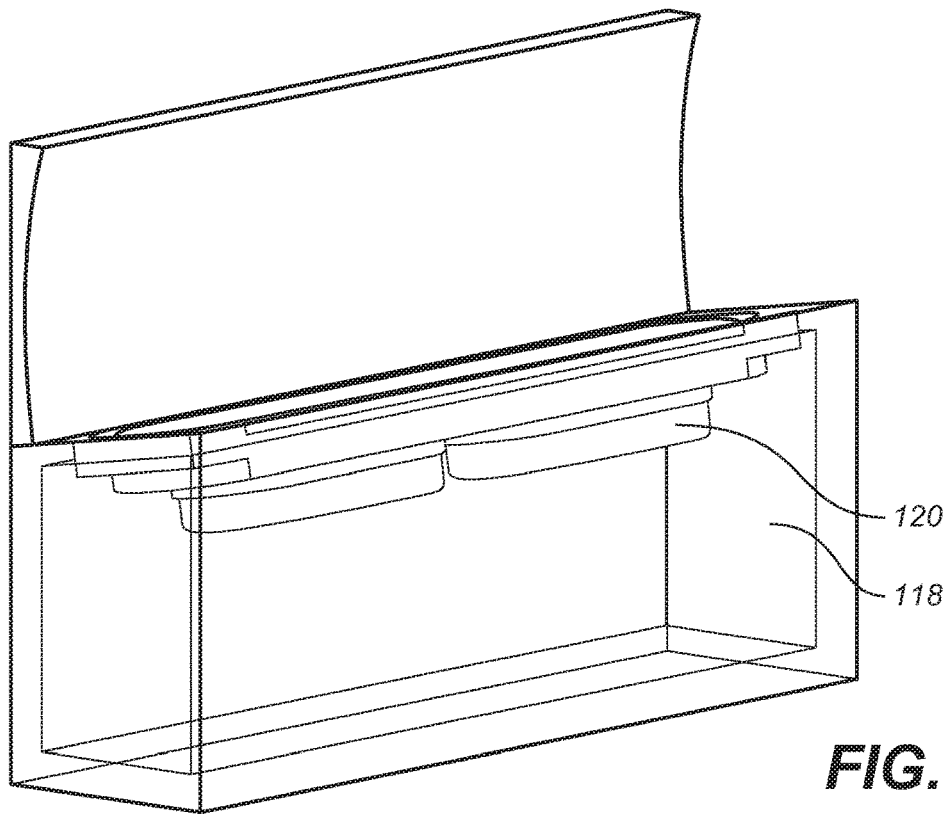
FIG. 1D illustrates a cutaway view of the height speaker integrated with acoustic reflector and dual motor transducers, under some embodiments.

FIG. 1D illustrates a cutaway view of the height speaker integrated with acoustic reflector and dual motor transducers, under some embodiments. Any appropriate transducer design may be used with the height channel speaker 110, and in the embodiment shown in FIG. 1D, a dual transducer motor design is shown as an example. In the cutaway view of FIG. 1D, dual transducer motors 120 are shown in the sealed acoustic back volume area 118. This transducer motor design is responsible for converting the electrical signal into mechanical movement of the voice coil. The transducer motor design consists of the voice coil, magnets, steel piece components. Although dual transducer motors are shown, any appropriate number of transducer motors are also possible, such as single transducer, car an array of transducers, depending on system constraints and requirements. In addition, the tilt angle of the transducers may be fixed by the mounting plane 112, or they may be variable, such as through manual or electrical (servo) control. Furthermore, a dual or multi-transducer motor design may have different tilt angles for different transducers.

The acoustic reflector height channel speaker 110 may be used with any appropriate audio device, audio playback system, loudspeaker system, and so on. In an embodiment, such a speaker is used with a device that presents certain space or installation constraints, such as a flat panel television, portable computer, tablet computer, and so on, that is configured to play back immersive audio content that includes at least some height channel audio content.

Figure 2A:
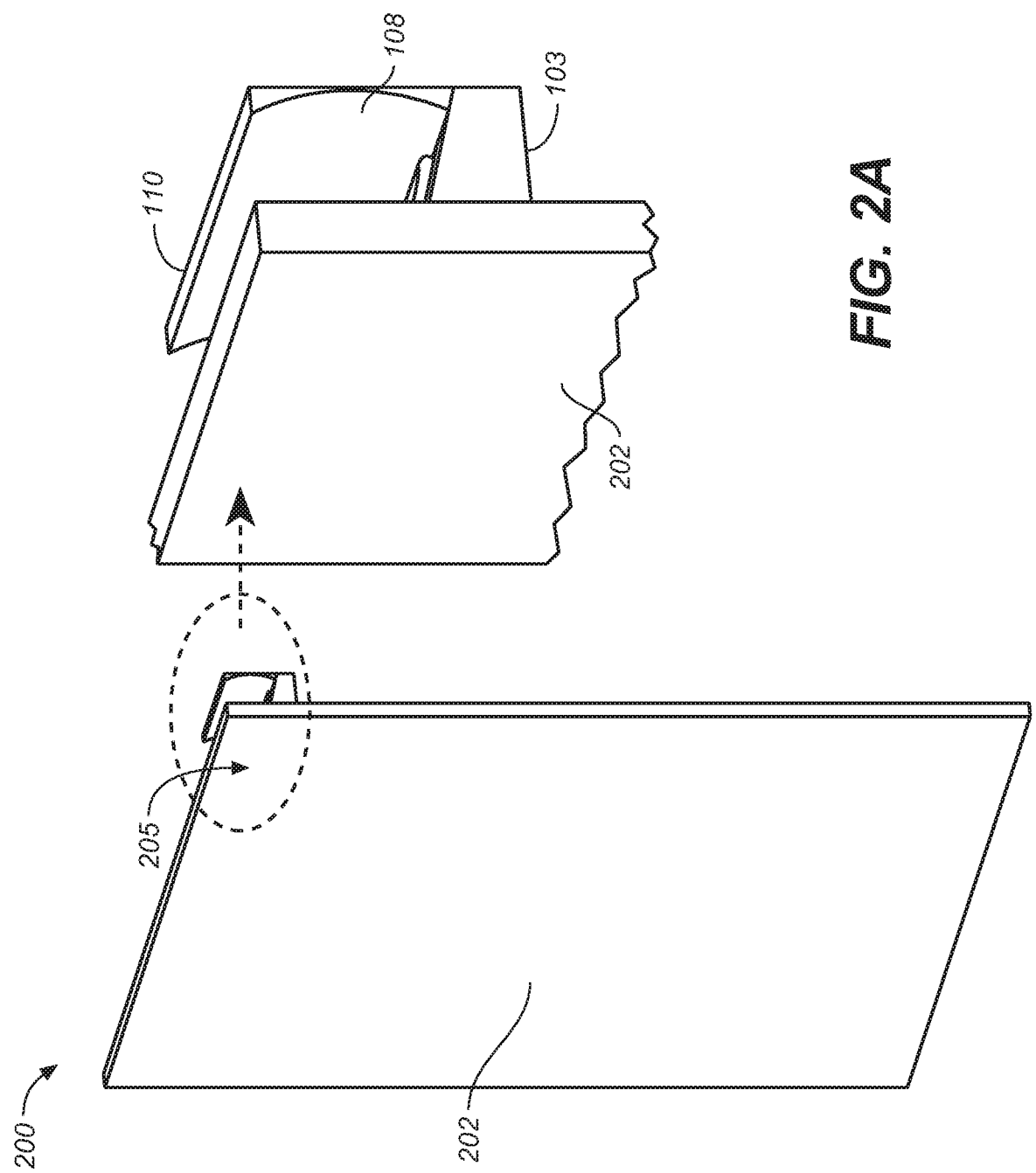
FIG. 2A illustrates a perspective view of an acoustic reflector height channel speaker used with a flat panel television, under some embodiments

FIG. 2A illustrates an acoustic reflector height channel speaker used with a flat panel television, under some embodiments. The installed speaker assembly 200 comprising the speaker 110 having cabinet 103, transducer, and acoustic reflector 108 is shown attached to a side of a flat panel television screen 202. Depending on the configuration of the television 202 or other device, the speaker assembly 200 may be mounted on either or both of the front or back side of the display panel, and may be positioned in any appropriate location, such as an upper corner 205, as shown, or any other appropriate location. Additionally, more than one speaker assembly may be used, such as one on each of the upper corners, for stereo playback, and so on.

FIG. 2B illustrates a front view of the flat panel television of FIG. 2A with acoustic reflector height channel speakers mounted on the rear side of the display panel. As shown in FIG. 2B, the speakers 110 are mounted on the upper corners of the rear side of display panel 202 such that the panel itself blocks any direct sound radiation from the speakers. That is, the speakers are mounted so that they are flush or below the top edge 210 of the display 202. Although the speakers are shown as mounted at the corners, they may be mounted at any appropriate location along the upper edge 210 of the display 202.

Although FIGS. 2A and 2B illustrate use of acoustic reflector height channel speaker 110 with a flat panel television, it should be understood that embodiments are not so limited, and any appropriate audio or audio/visual (A/V)

playback device may be used, such as a desktop computer, portable computer, game console, tablet device, mobile phone, and so on.

The acoustic reflector height channel speaker 110 may be attached to the device or panel 202 through appropriate means, such as glue, nails, screws, bonding, and so on. Alternatively, it may be a structure that is integrated with or manufactured as part of the panel 202.

As shown in FIG. 2, the configuration and location placement the acoustic reflector height channel speaker 110 is mounted behind the display panel and below the upper surface of this panel such that the inclined plane of cabinet 103, the height speaker transducer and the acoustic reflector 108 are all completely occluded structurally and acoustically from a listener facing the front side of the panel. The device or panel 202 may be placed against a wall or other structure to enhance or modify the occlusion of the acoustic reflector height channel speaker 110 in relation to the listener.

Figure 3:
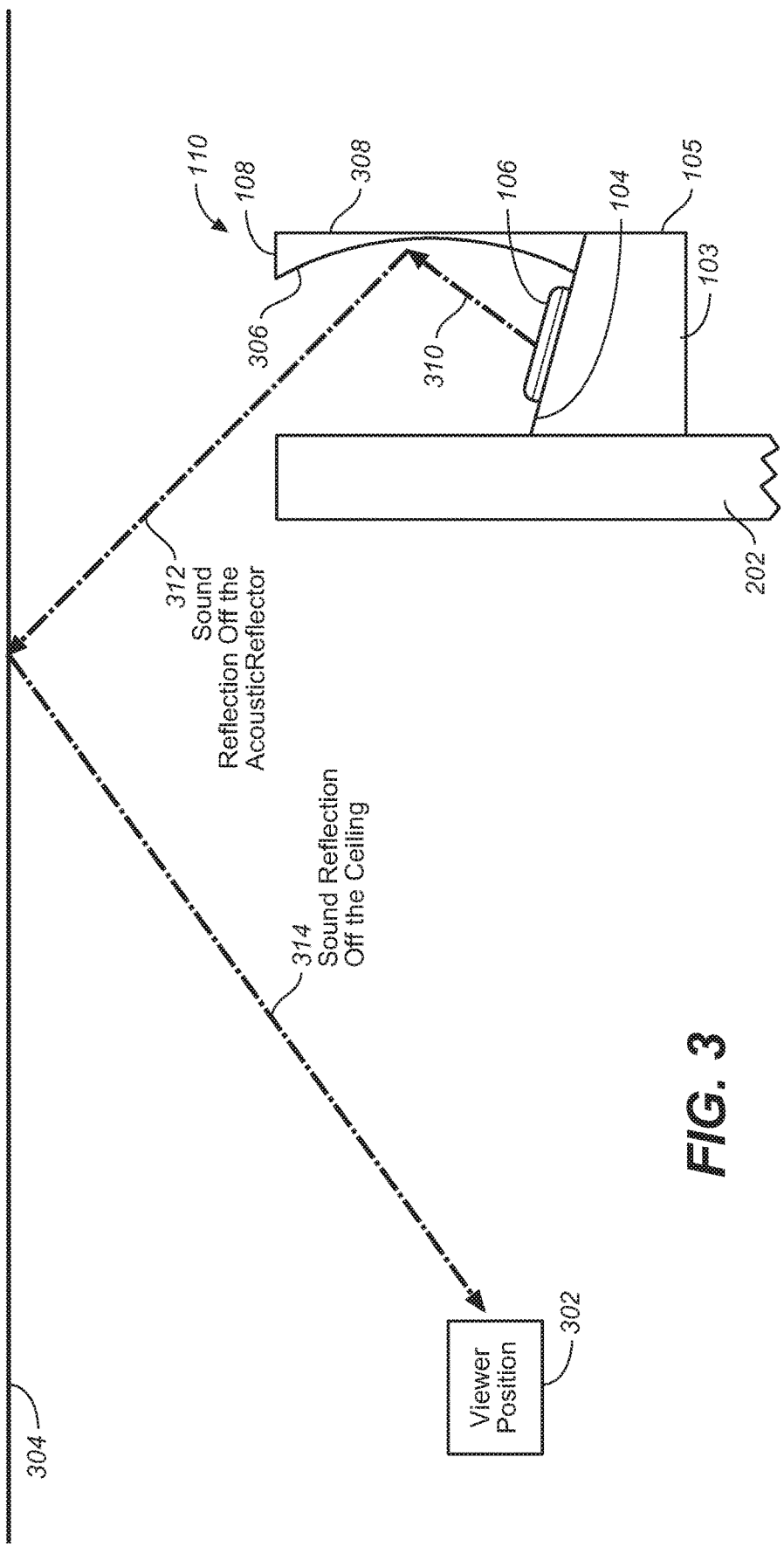
FIG. 3 illustrates the A/V device and speaker assembly of FIG. 2 as used to reflect sound off of a ceiling to a listener, under some example embodiments.

FIG. 3 illustrates the A/V device and speaker assembly of FIG. 2 as used to reflect sound off of a ceiling to a listener, under some example embodiments. As shown in FIG. 3, the A/V device with panel 202 and attached acoustic reflector height channel speaker is positioned such that the speaker projects sound at an angle up to the ceiling 304 where it can then bounce back down to a listener or viewer ("user") located at a certain viewing position 302.

The relevant components of the acoustic reflector height channel speaker 110 when used with panel 202 are the acoustic reflector 108 attached to a back or lower side 105 of speaker cabinet 103. The acoustic reflector 108 has a wall portion 308 that is formed in a concave shape such that an acoustic reflector surface 306 is produced to provide directed reflection of sound from transducer 106. Transducer 106 is mounted on the inclined upper surface 104 of cabinet 103 to direct sound onto the acoustic reflector surface 306.

The reflected sound components from acoustic reflector height channel speaker 110 comprise direct sound 310 projected from the transducer 106 along a radiant axis of the transducer to the acoustic reflector surface 306 of the acoustic reflector 108. This sound is projected upward as sound reflection 312 off of the acoustic reflector to the ceiling (or other upper room surface) 304. The sound is then reflected 314 off of the ceiling down to the listener in the viewing position 302.

It should be noted that the example embodiment of FIG. 3 is provided to show the reflection of sound from the acoustic reflector height channel speaker off of a ceiling surface, and is not necessarily drawn to scale, and any configuration and placement of the speaker and A/V device within a room are possible.

Figure 4C:
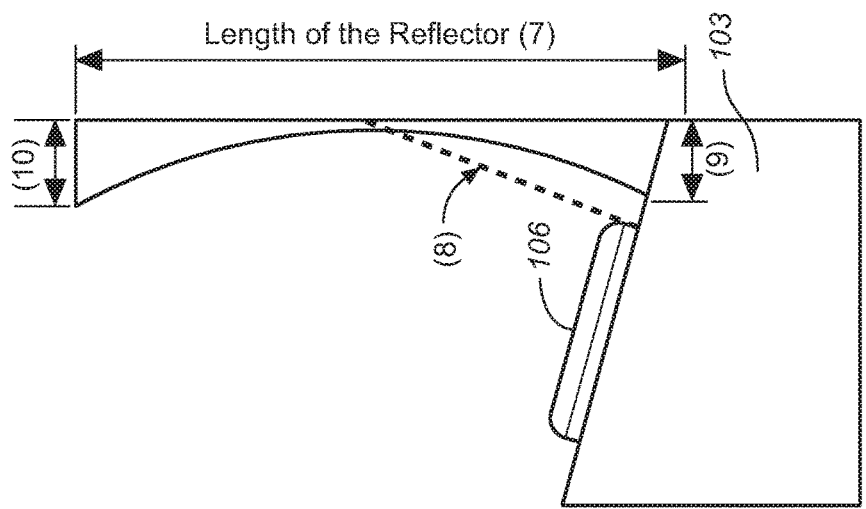
FIGS. 4A, 4B, and 4C illustrates some the relevant design parameters of the acoustic reflector height channel speaker, under some embodiments, where
Figure 4B:
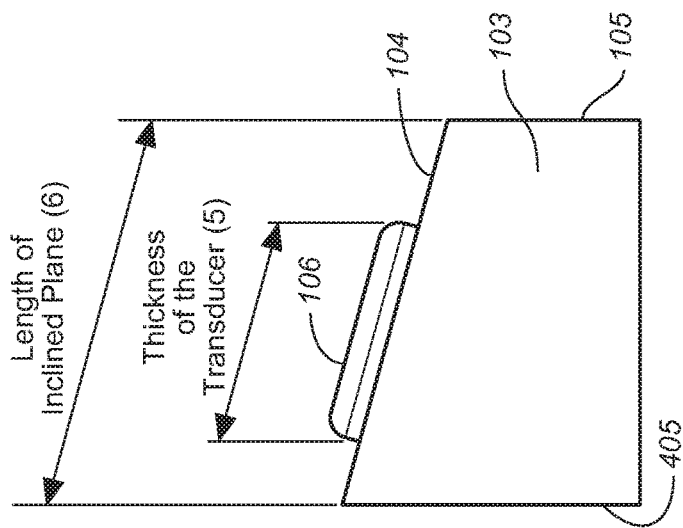
Figure 4A:
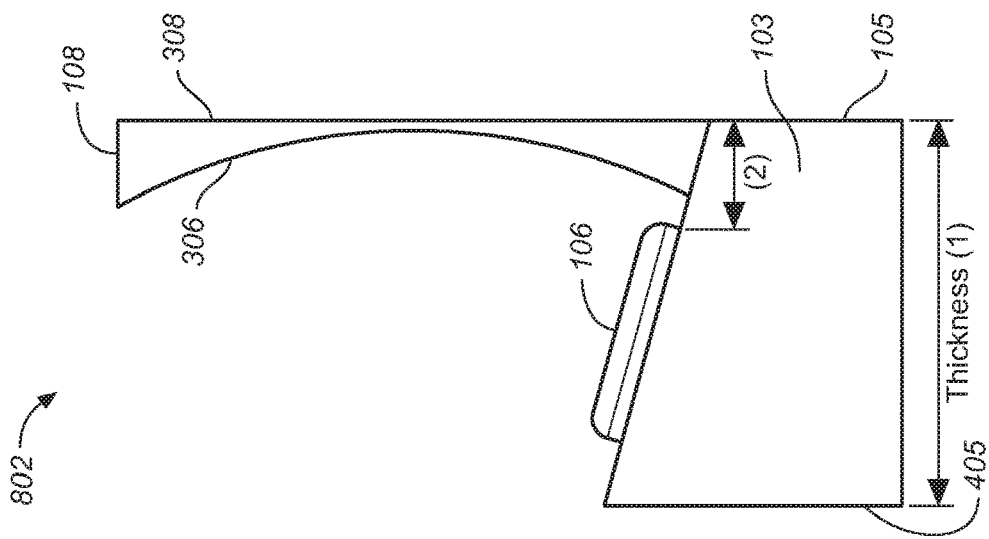

To produce desirable reflected sound, certain parameters of the acoustic reflector height channel speaker 110 may be defined and specified. FIGS. 4A, 4B, and 4C illustrates some the relevant design parameters of the acoustic reflector height channel speaker, under some embodiments. In an embodiment, at least some of the variables dictating performance of the acoustic reflection height channel speaker comprise: thickness of the speaker, surface geometry of the reflector (e.g., flat, concave, convex, or a combination of flat and curvilinear), length of the reflector, point of incidence of the radiant axis of the transducer on the reflector, tilt angle of the inclined mounting plane (e.g., greater than 0 and lesser than 90 degrees), shape of the transducer (e.g., circular or oblong), number of transducers, and placement of the acoustic reflector relative to the transducer. The numerical value of each of the variables is specific to particular devices and systems, may vary depending on the unique product requirements.

As shown in FIG. 4A, a first design parameter is the thickness (1) of the cabinet 103. The thickness (1) represents the overall thickness of the height speaker module before attachment to a device or display panel. Based on implementation constraints, the thickness (1) is a parameter that helps determine most or all the other parameters. The thickness of the height speaker is typically provided or specified based on industrial design (ID) requirements for the overall A/V device, such as the television, computer, game console, and so on. All of the parameters together determine the acoustic performance of the reflector, and are typically optimized such that majority of the sound reflections 312 from the acoustic reflector 108 are reflected and focused towards the ceiling 304 to create an immersive audio experience by reflecting sound off the ceiling to the listener/viewer position 302. In an example flat panel television display implementation, the thickness (1) was on the order of 24 mm, but any appropriate thickness may be used depending on the device and system configuration.

A second design parameter is the surface geometry of the reflector surface 306 of acoustic reflector 108. This geometry may be flat, concave, or convex, or a compound surface combining any of these geometries, as needed for a particular application. The geometry illustrated in FIGS. 4A-4C is a concave geometry, but embodiments are not so limited. FIG. 4C illustrates variables defining the geometry of the acoustic reflector, under some embodiments. As stated above, the illustrated embodiment of FIG. 4C shows an acoustic reflector with an example concave surface geometry. Concave surfaces generally help in reflecting, shaping, and focusing sound waves more efficiently than flat or convex surfaces. When defining the reflector geometry and dimension, the length of reflector (7) must be defined or identified. The acoustic reflector functions as an acoustic lens creating a virtual image of the real sound source. The length of the reflector, the position of the real sound source and the curvature of the reflector surface 306 are designed such that characteristics of the virtual image are equivalent to a real sound source. In addition, the amount of curvature of the reflector surface and the position of the real sound source also controls the position of the principal focal point of reflector.

The curvature of the concave acoustic reflector surface 306 is generally defined using a spline curve with two control points, one point at the base of the reflector surface and the other point at the exit of the reflector. The curve is driven tangentially at both these points. An example curvature provides a termination angle of the curve at the exit at 65 degrees and at the base of the reflector at 101 degrees, however this is one example, and any other practical configuration is also possible. The base point is selected such that there is minimum specified distance (e.g., at least 1 mm) between the base point and the transducer. This minimum specified distance is beneficial for easy assembling of the acoustic reflector onto the height speaker modules. The exit point is selected such that an acoustic reflector design with minimum manufacturable wall thickness (e.g., at least 1.5 mm) is achievable while meeting the desired reflector surface curvature requirements. In an example implementation, the thickness at the reflector base (9) is on the order of 3 mm and the thickness of the top portion of the reflector is on the order of 4 mm, and the minimum wall thickness of the acoustic reflector is 1.8 mm.

FIG. 4B illustrates variables defining the tilt angle of the transducer relative to the acoustic reflector, under some embodiments. As shown in FIG. 4B, the tilt angle (3) (also called theta, θ) is the amount of inclination of the mounting plane of the inclined surface 104 in or on which the transducer 106 is mounted. The length of the inclined plane (6) is directly derived from the thickness of the transducer (5), curvature of the reflector surface (306) and the tilt angle (3). In general, the thickness of the transducer (5) has a different influence on the Sound Pressure Level (SPL) output and directivity of the height speaker module as the radiated far field sound pressure of a transducers is directly dependent on the radiating surface area of the transducers. As the thickness decreases, the radiating surface area of an individual transducer decreases, and hence the SPL output decreases and results in narrower dispersion of the height speaker. This decrease can be compensated for by using multiple transducers to increase the SPL output. The directivity requirement can be compensated by adequately designing the acoustic reflector 306 profile.

In an example embodiment, the value of the tilt angle is a 10 degrees tilt based on the thickness requirements and also the overall z dimension (also called height) of the transducer; the length of the inclined plane is on the order of 24.5 mm, and the thickness of the transducer (5) is on the order of 15 mm. This is provided for purposes of example only, and any other practical dimensions and tilt angles are also possible.

Placement of the transducer 106 within the cabinet 103 and on the inclined surface 104 can also be varied depending on system requirements. As shown in FIG. 4B, the distance of the mounting position of the transducer 106 from the back side 405 of enclosure 103, can be set at a specified distance (4). This distance is typically selected such that there is minimum clearance between the transducer motor and height speaker enclosure walls. In an example embodiment this distance may be on the order of 4.5 mm, but embodiments are not so limited. Certain minimum distances (e.g., 1 mm) between the rear mounting position of the transducer and based of the reflector may be chosen to facilitate assembly of the acoustic reflector 108 with the speaker cabinet 103.

The tilt angle (3) along with the geometry of the acoustic reflector 306 and the size and configuration of the transducer 106 generally determine the trajectory of the reflected sound waves 312, 314. In an embodiment, the transducer mounting plane 104 may be tilted forward at an angle between 0 degrees and 90 degrees relative to the horizontal plane. As FIG. 3, the transducer 106 radiates acoustic energy along a direct axis 310 perpendicular or substantially perpendicular to a front surface (face) of the inclined surface of the cabinet to the acoustic surface 306. Although an example tilt angle of 10 degrees is illustrated, it should be noted that any similar angle may be used, such as any angle may be used depending on the configuration of the speaker, the geometry of the acoustic surface, and the size of the device and room.

The transducer may be installed at a fixed angle (based on the inclined surface of the cabinet), or it may be installed such that the tilt angle may be adjusted manually, such as through movable transducer mounting components. Alternatively, a servo mechanism may be used to allow automatic or electrical control of the tilt angle and projection direction of the transducer. The tilt angle may be configured or modified to help project the sound through reflection off the ceiling to a different or more central location within the listening environment.

For the embodiment shown in FIGS. 4A-C, the concave acoustic reflector surface 306 has a relatively sharp corner along its top edge. In certain cases, such a sharp corner may produce some degree of acoustic diffraction as the sound waves exit the reflector surface. To mitigate this acoustic diffraction effect, the concave reflector surface may be rounded off to produce a smooth corner end-termination. FIG. 5A illustrates a side view of an acoustic reflector height channel speaker having a convex surface with a smooth corner, and FIG. 5B illustrates a front perspective view of this speaker, under some embodiments.

The following descriptions of one or more further embodiments will focus on the differences between it and the previously described embodiment. Therefore, features which are common to both embodiments will be omitted from the following description, and so it should be assumed that features of the previously described embodiment are or at least can be implemented in the further embodiment, unless the following description thereof requires otherwise.

Figure 5B:
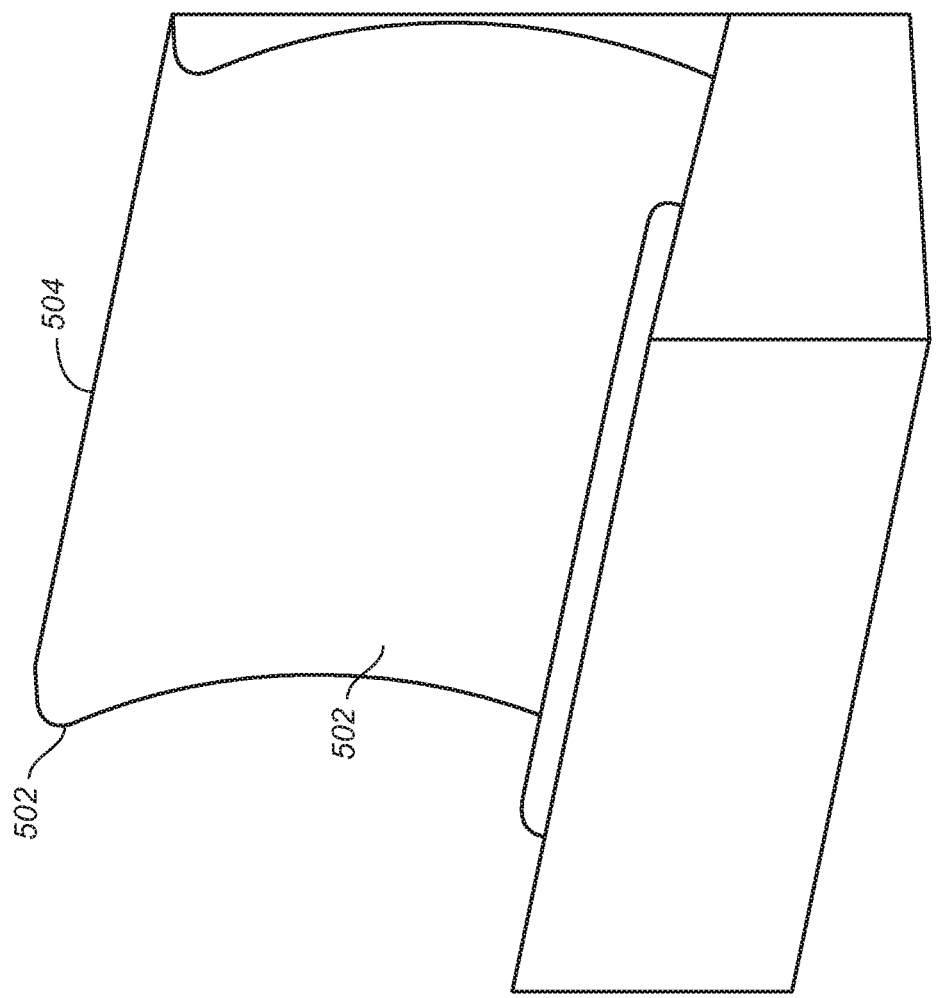
FIG. 5B illustrates a front perspective view of the speaker of FIG. 5A, under some embodiments.
Figure 5A:
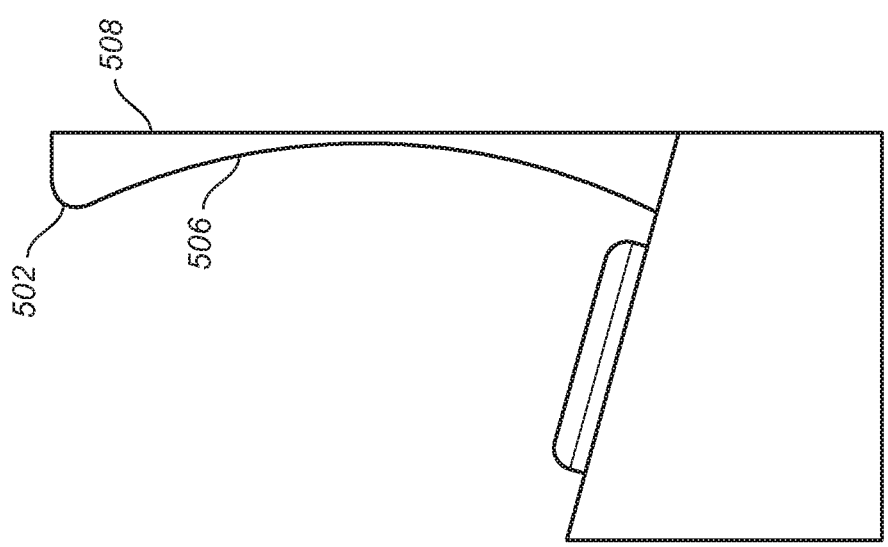
FIG. 5A illustrates a side perspective view of an acoustic reflector height channel speaker having a convex surface with a smooth corner.

As shown in FIGS. 5A and 5B, the acoustic reflector 508 having a concave acoustic reflecting surface 506 has an upper corner 502 along a length 504 of the acoustic reflector 508. This corner is rounded or smoothed to eliminate any sharpness along the length of the corner. Such a smooth end termination in this may be produced using a fillet of a specified radius (e.g., 2 mm). Various degrees of roundness or smoothness may be provided depending on the device and speaker configuration and dimensions. This smooth (non-sharp) corner at the termination of the acoustic reflector helps in mitigating acoustic diffraction occurring as the sound waves exit the acoustic reflector, and the smoothed corner can be shaped to optimize this effect.

Figure 6:
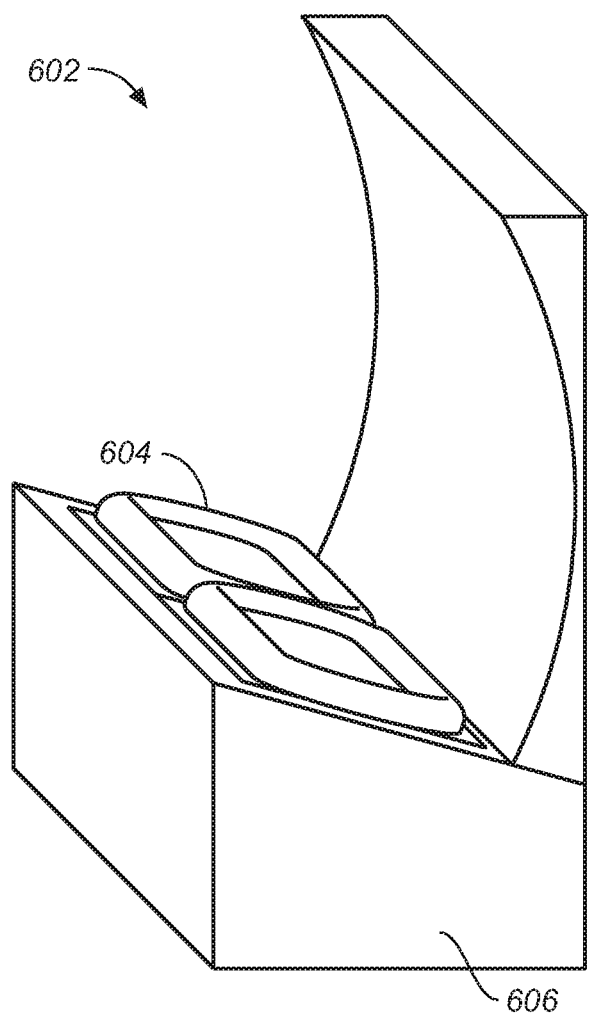
FIG. 6 illustrates an acoustic reflector height channel speaker having multiple transducers, under some embodiments.

As stated above, the acoustic reflector height channel speaker may be configured with any practical number and configuration of transducer or transducers. Typical implementations may have one circular transducer per speaker, but different numbers of different shaped transducers may be used, depending on system requirements and constraints. FIG. 6 illustrates an acoustic reflector height channel speaker 602 having multiple transducers 604, 606, under some embodiments. Using multiple transducers generally increases the amount of sound energy radiation from the height speaker helps improve the immersive audio experience for the listener. For the example embodiment of FIG. 6, two transducers having an oblong (racecourse) shape are used, though other numbers, shapes, and placements can also be used.

Using multiple transducers may increase overall speaker space requirements in certain cases, however desirable acoustic response may be achieved by finding the appropriate trade-off between transducer size and number for a given application.

Figure 7B:
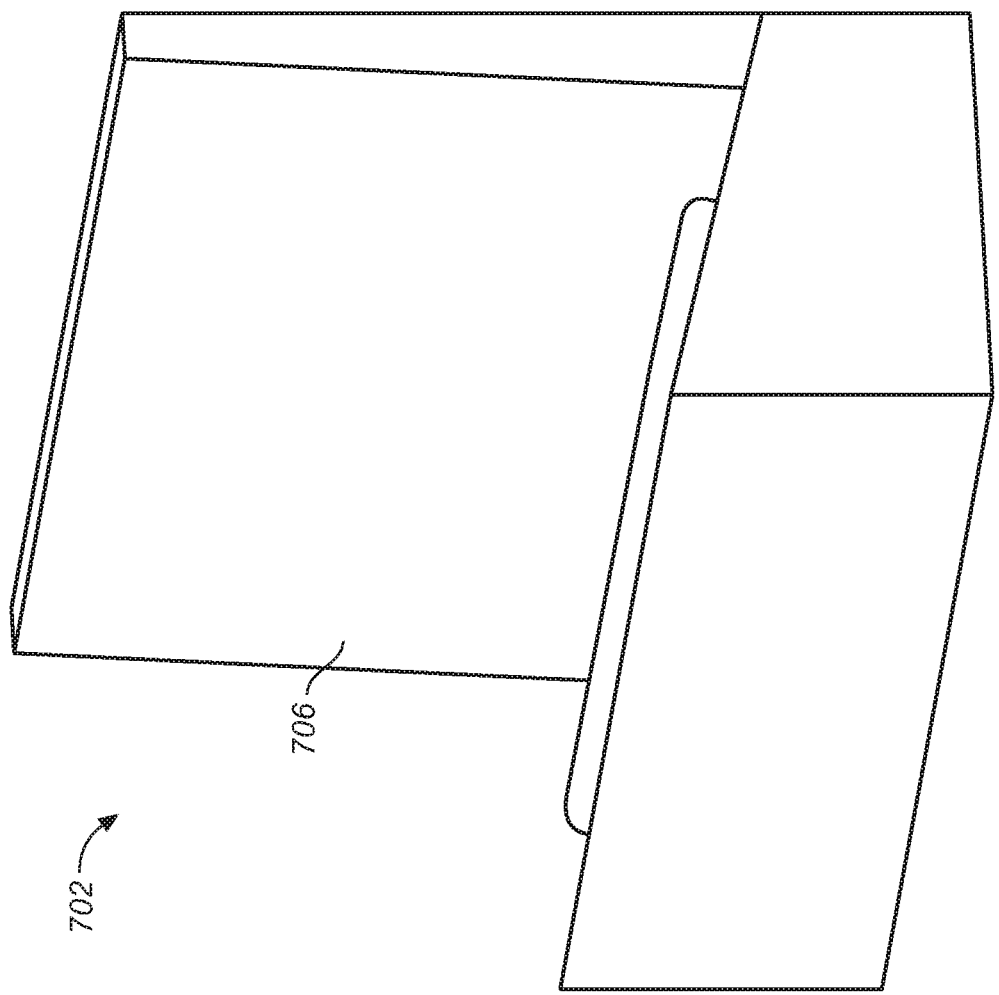
FIG. 7B illustrates a front perspective view of the speaker of FIG. 7A, under some embodiments.
Figure 7A:
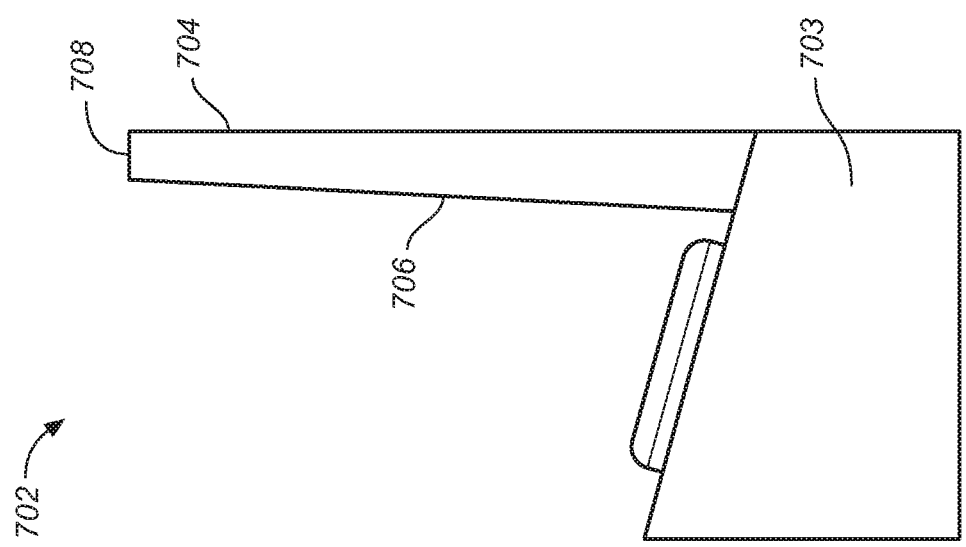
FIG. 7A illustrates a side view of an acoustic reflector height channel speaker having a flat surface acoustic reflector, under some embodiments.

As stated above, the acoustic reflector geometry may be configured as any appropriate surface shape, such as concave (as shown) or any other appropriate geometry. In an embodiment, the acoustic reflector may have a flat reflector surface geometry. Such an embodiment is illustrated in FIGS. 7A and 7B. FIG. 7A illustrates a side view of an acoustic reflector height channel speaker 702 having a flat surface acoustic reflector 704, and FIG. 7B illustrates a front perspective view of the speaker of FIG. 7A, under some embodiments. The flat surface 706 of acoustic reflector 708 is configured to tilt away from the transducer. This orientation can be produced by providing a tapered reflector that is narrower at its top end 708 than at its bottom end that is attached to cabinet 703. The embodiment of FIG. 7B shows a slightly rearward tapered acoustic reflector. The acoustic reflector may instead be configured to have a forward taper such that the top end is wider than the bottom end. Any appropriate amount of taper, or no taper may be provided, as required. The amount of tilt or taper angle of the flat acoustic projector 704 may be configured in any appropriate way depending on the configuration and constraints of the device and speaker system. For example, such a flat reflector surface geometry can be used in situation where a concave surface is not quite feasible due to thickness or other constraints. In addition, a flat surface reflector may be cheaper and easier to produce and install as compared to a shaped (concave, convex, compound) acoustic reflector.

Figure 7C:
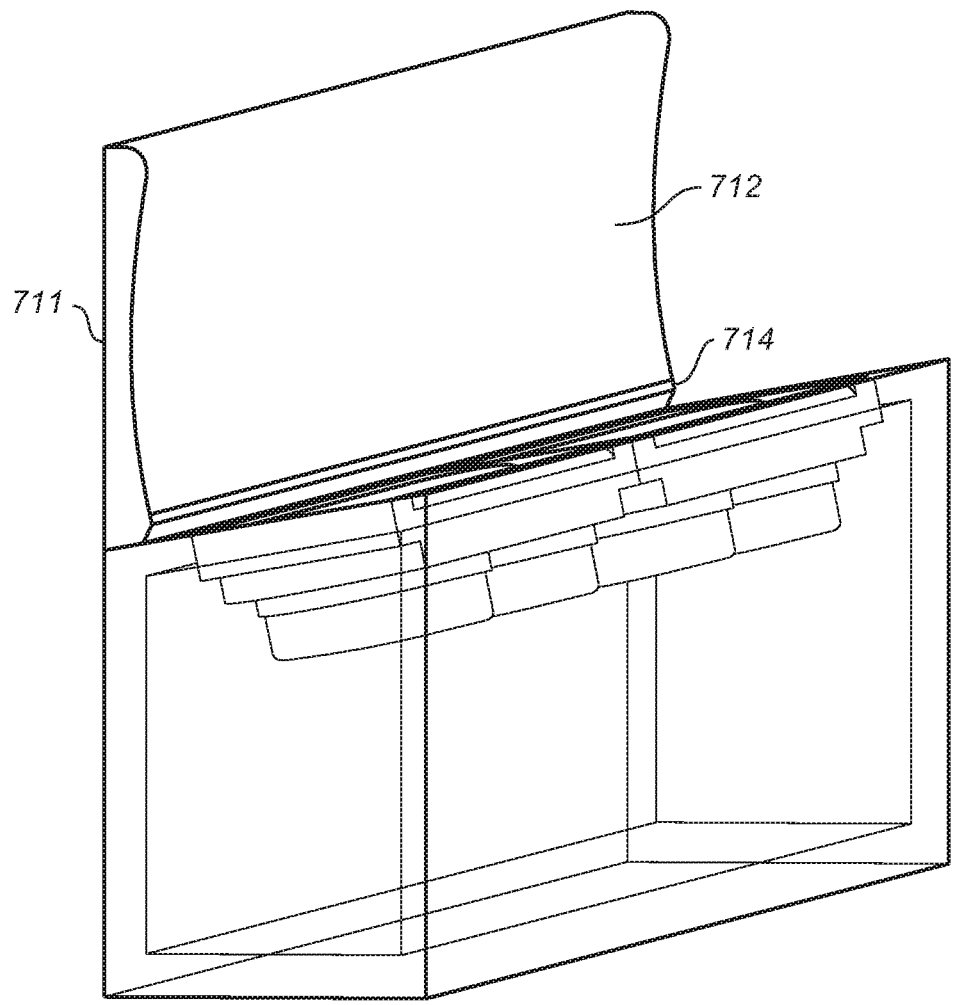
FIG. 7C illustrates an example of a combined linear and curvilinear surface for the acoustic reflector, under some embodiments.

In an embodiment, different types of straight or curved surfaces may be combined to form the acoustic reflector. FIG. 7C illustrates an example of a combined linear and curvilinear surface for the acoustic reflector, under some embodiments. As shown in FIG. 7C, the acoustic reflector 711 has a curved surface 712 and a flat or linear surface portion 714. The relative distribution of these different surfaces may be changed depending on system requirements and configuration.

For the embodiments so far described, the acoustic reflector is mounted to one side of the inclined speaker cabinet to form an acoustic reflector height channel speaker 110 that, by itself, is open on one side. This open side is closed off when the speaker is mounted to a device by the back surface of the device or panel 202, as shown in FIG. 2A. When mounted in an appropriate location, this provides the audio occlusion for full reflection of the sound waves to the ceiling, as shown in FIG. 3. In an embodiment, the acoustic reflector may comprise a two-part structure that closes off both sides of the cabinet, as illustrated in FIGS. 8A and 8B. FIG. 8A illustrates a side view of an acoustic reflector height channel speaker with a two-part curved wall structure for the acoustic reflector, and FIG. 8B is a front perspective view of the speaker of FIG. 8A, under some embodiments. As shown in FIG. 8A, a concave acoustic reflector 808 is mounted to lower side of inclined slope cabinet 803, as described above, to reflect sound transmitted by transducer 805. For this embodiment, a curved wall structure 806 is added and attached to the opposite (higher) side of the inclined slope cabinet 803. This creates a flared wall structure 802 that forms a uniform transmission channel for the sound waves projected from transducer 805.

Using the flared wall structure 802 illustrated in FIG. 8A helps to increase the amount of sound energy reflected from the acoustic reflector 808 towards the ceiling. The flared wall structure helps in mitigates the occurrence of acoustical standing waves between the vacuity of the acoustic reflector 808 and the occlusion structure, which is typically the back of panel 202. In addition, flared wall structure 802 also provides structural and acoustical occlusion for a standalone height speaker. FIG. 8B illustrates a perspective view of the acoustic reflector height channel speaker with flared wall structure 802. This view illustrates the attachment of the curved wall structure 806 on the speaker cabinet 803 along the length of its higher side. Attachment may be by any appropriate mechanism, such as glue, nails, screws, integral manufacture, and so on.

The flared wall structure of FIG. 8A is shown providing a uniform curve defined by the curvature of the acoustic reflector 808, but embodiments are not so limited. The curvature of curved wall structure 806 can be configured to differ from the curvature of acoustic reflector 808. For example, it may be provided as a straight, flat or angled surface or convex or compound shaped wall. Any appropriate shape or curvature of either or both of the curved wall structure 806 and acoustic reflector 808 may be used to create a desired flare shape for the flared wall structure 802.

Figure 9A:
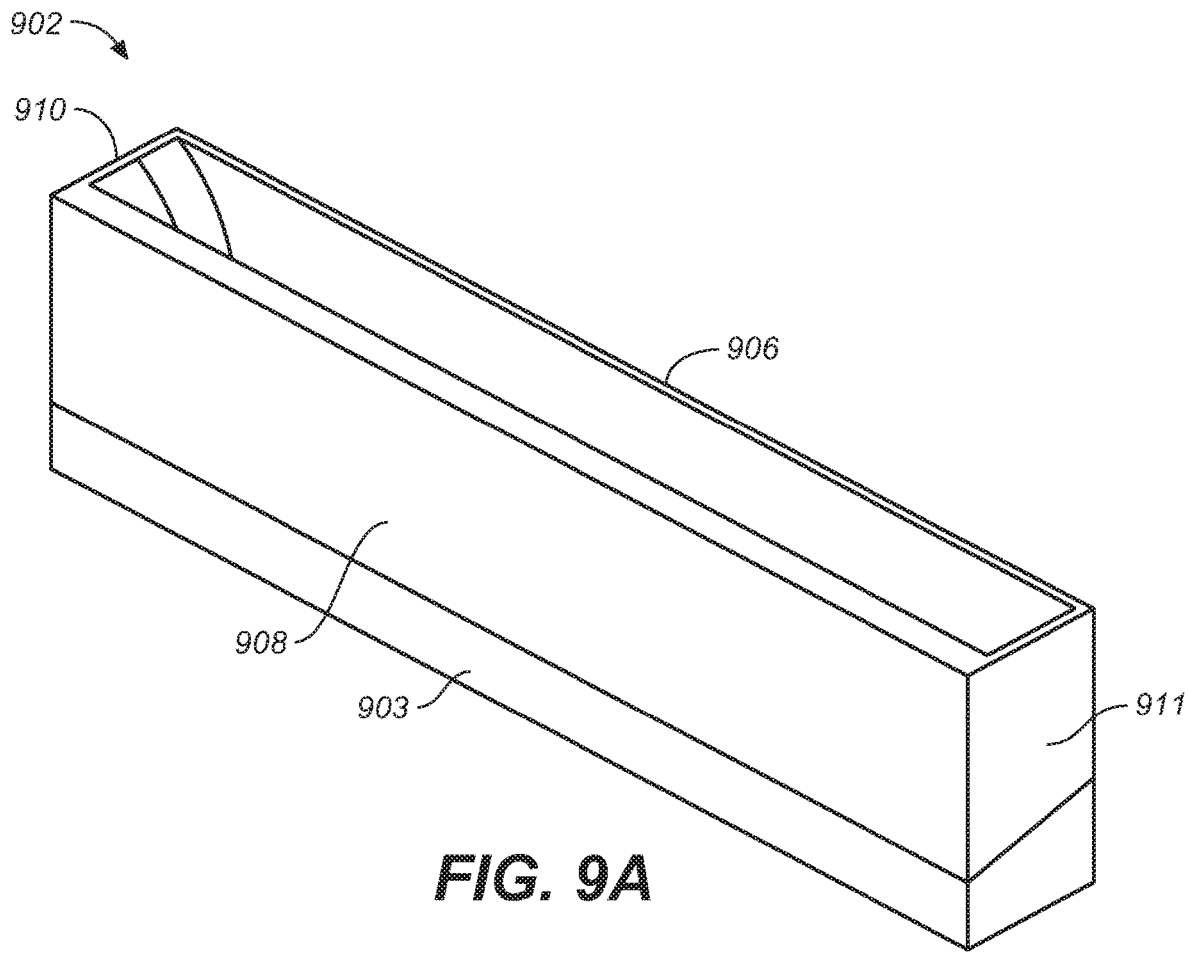
FIG. 9A illustrates a front perspective view of a waveguide with an embedded acoustic reflector surface for a height channel speaker, under some embodiments.
Figure 9B:
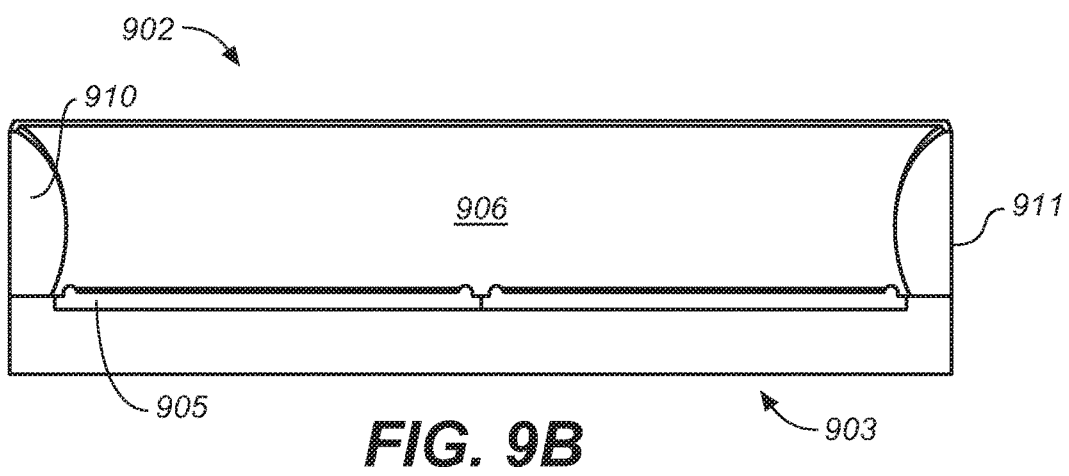
FIG. 9B is a cutaway view of the speaker of FIG. 9A under some embodiments.

The embodiment of FIGS. 8A and 8B feature a flared wall structure with open ends. In an embodiment, these ends may be closed off to produce an acoustic reflector using a curved wall structure along both the length and width sides of the acoustic reflector height channel speaker, as illustrated in FIGS. 9A and 9B. FIG. 9A is a front perspective view of a closed flared wall structure for an acoustic reflector height channel speaker, and FIG. 9B illustrates a front cutaway view of the speaker of FIG. 9A, under some embodiments. As shown in FIG. 9A, closed flared wall structure 902 is installed on or formed as part of the height channel speaker cabinet 903. The closed flared wall structure comprises the acoustic reflector 908 attached to a lower side of the cabinet 903 for reflecting sound waves from the transducer 905 and a curved wall structure 906 attached to the higher side of cabinet 903. One side wall 910 is attached to these wall structures to acoustically close off one end of the flared wall structure 902, and a second side wall 911 is attached to the wall structures to acoustically close off the other end of the flared wall structure 902. This closed flared wall structure on the width side of the height speaker will help mitigate stray radiation of the height speaker transducer.

The side walls 910 and 911 may themselves be shaped or curved to enhance any sound transmission and reflection effects. As shown in FIG. 9B, the side wall structures 910 and 911 are both curved inward (convex) relative to the transducer or transducers 905, though embodiments are not so limited. The shape and curvature or either or both side walls may be configured to produce a sound transmission tunnel that has a specific desired profile, such as a cylindrical cross-section, a flared cross section, and so on. Such a profile may be referred to as a speaker "mouth profile" as the closed wall structure effectively forms a mouth when installed on the height speaker. The mouth profile may have different contours including rectangular shape, elliptical shape, circular shape, trapezoidal shape, and so on.

Figure 10A:
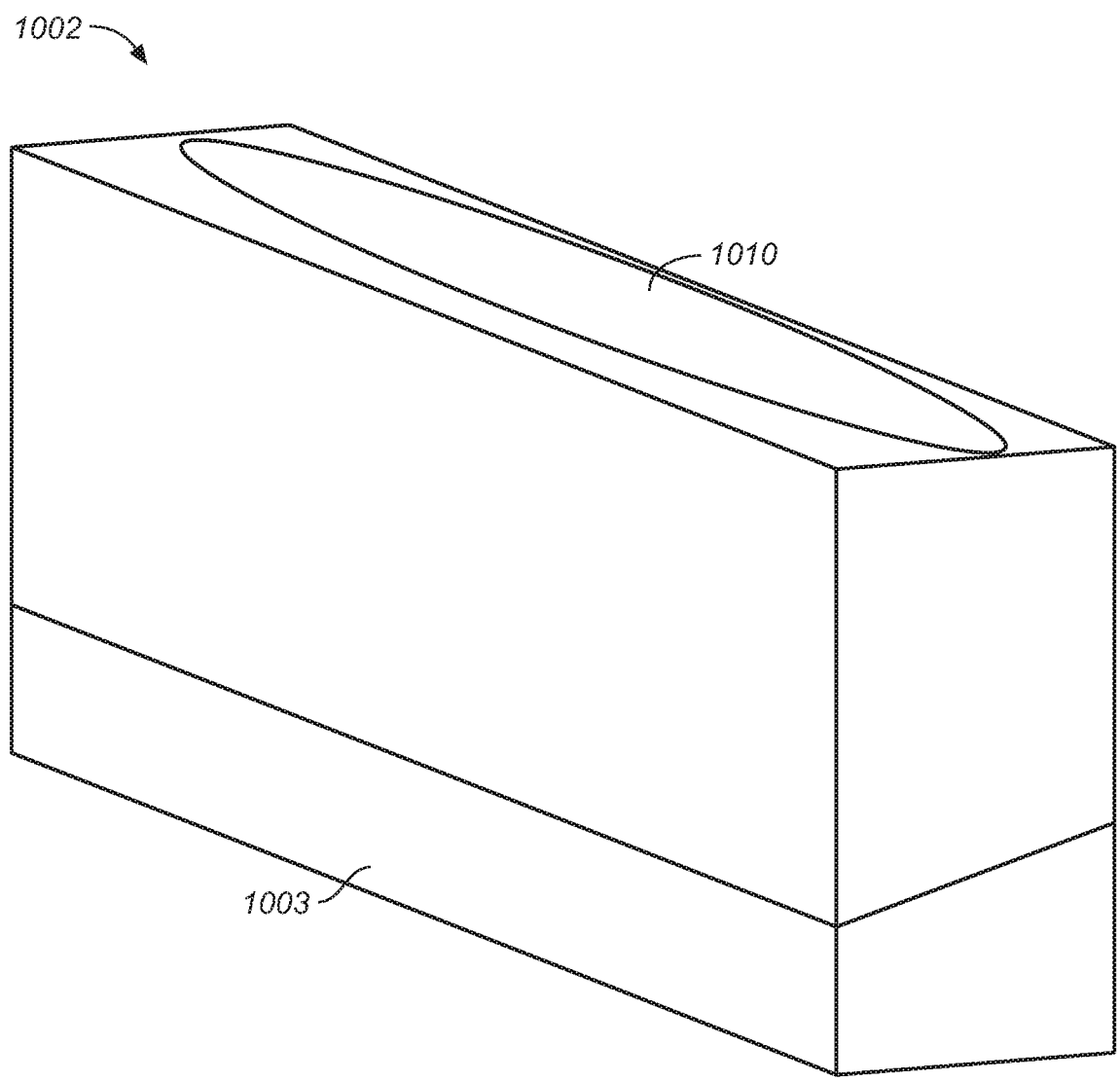
FIG. 10A is a front perspective view of a closed wall structure for an acoustic reflector height channel speaker having an elliptical mouth profile, under some embodiments.
Figure 10B:
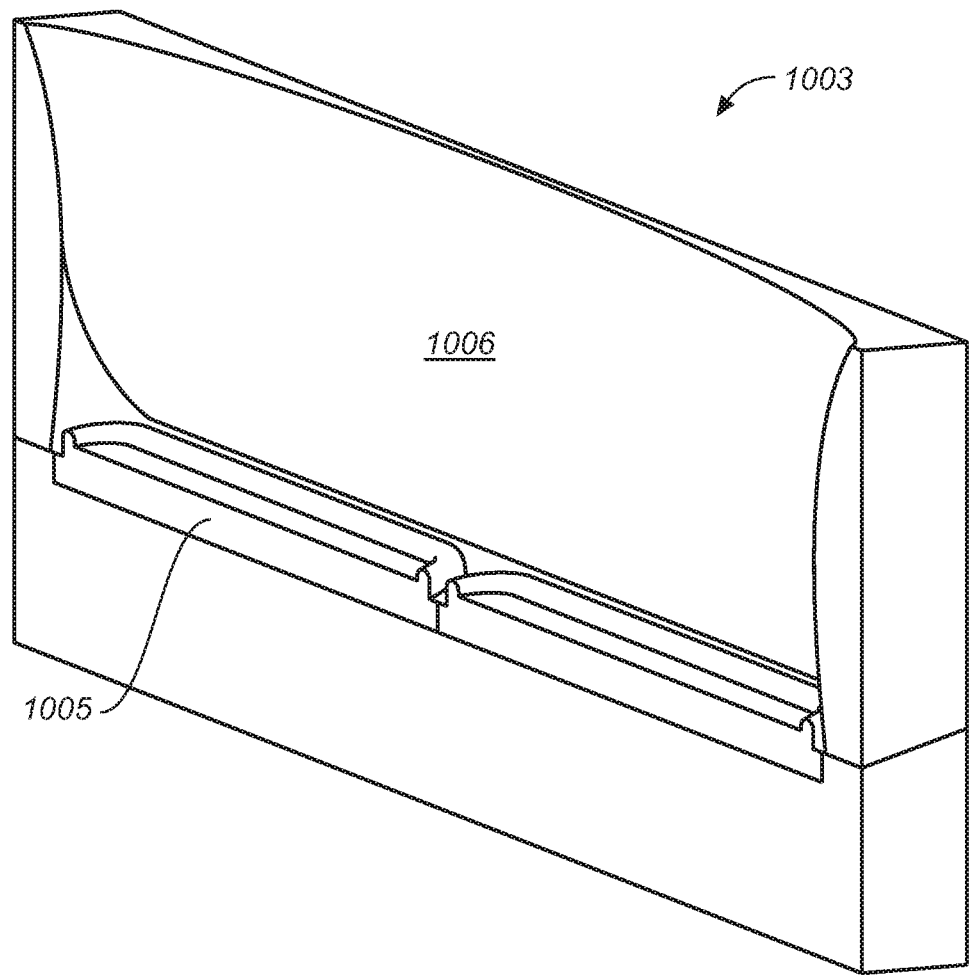
FIG. 10B illustrates a front cutaway view of the speaker of FIG. 10A, under some embodiments.

FIG. 10A is a front perspective view of a closed wall structure for an acoustic reflector height channel speaker having an elliptical mouth profile, and FIG. 10B illustrates a front cutaway view of the speaker of FIG. 10A, under some embodiments. As shown in FIG. 10A, a closed, elliptical wall structure 1002 is installed on height channel speaker 1003. As can be seen, the opening 1010 of the wall structure is formed in an elliptical shape by virtue of the shaping of the inner surfaces 1006 of the front, back, and side walls of the wall structure. The curvatures are shown in the perspective cutaway view of FIG. 10B. The elliptical profile for the mouth opening as shown in FIG. 10A can be used to control the directivity of the height speakers. Other shapes may be employed to impart different directivity characteristics.

In an embodiment, the closed wall structure may be formed as a unitary structure that is fit onto or formed as part of the speaker cabinet 1003. For this embodiment, the curved surfaces may be carved into or formed as part of a tubular (rectangular or circular) structure of appropriate dimensions and materials. The curved inner surface areas 1006, may be formed such that any appropriate shape is provided for the volume above the transducers 1005.

Any appropriate number and shape/size of transducer may be used for the closed wall structure, acoustic reflection height channel speaker. For the example embodiment of FIG. 10B, in which the mouth 1010 is formed as a narrow ellipse, two or more rectangular transducers may be used, as shown. Alternatively, a linear array of small circular transducers may be used.

Figure 11:
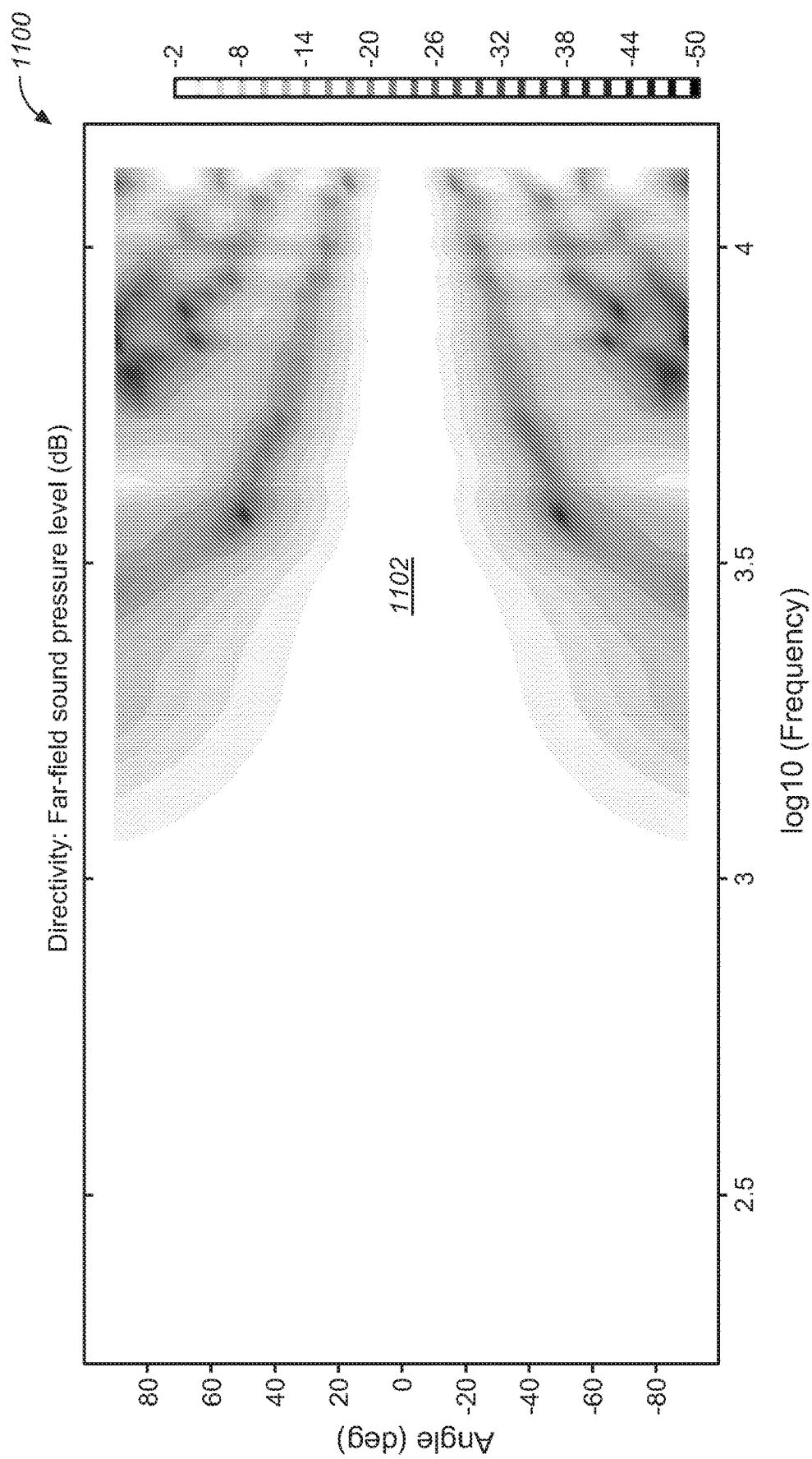
FIG. 11 is a contour plot illustrating an acoustic directivity response for the example rectangular mouth acoustic reflection height channel speaker of FIG. 9A, under some embodiments.

As mentioned above, a specific mouth profile can be used to control the directivity of the height speakers. FIG. 11 is a contour plot 1100 illustrating an acoustic directivity response 1102 for the example rectangular mouth acoustic reflection height channel speaker of FIG. 9A, under some embodiments. The directivity contour plot 1100 provides information related to the spatial response of the height speaker module by showing the variation in far-field SPL across different horizontal angles from −90 degrees to +90 degrees. For the example directivity response 1102 shown, the speaker exhibits a uniform directivity up to 12 degrees up to 14 kHz. By optimizing the horizontal directivity of the height speaker module, embodiments of the speaker can ensure uniform acoustic energy distribution either on-axis or off-axis from the TV screen.

In an example embodiment in which the height speaker is relatively thin (e.g., cabinet thickness of approximately 2 mm), an expected operating bandwidth of the height speaker modules is in the range of 200 Hz to 18 kHz. For the embodiment of FIG. 9A, the height speaker with enclosed acoustic reflector forms or acts as a waveguide. This acoustic reflector waveguide (reflector enclosure) acts effectively like a closed acoustic pipe (acoustic duct). Typically, the fundamental frequency of a closed acoustic pipe is related to its length. When the wavelength of sound waves generated by the height speaker transducer coincidences with the fundamental frequency of reflector waveguide acoustic cavity, the amplitude of the sound waves might increase thereby increasing the loudness of the height speaker system.

Figure 12:
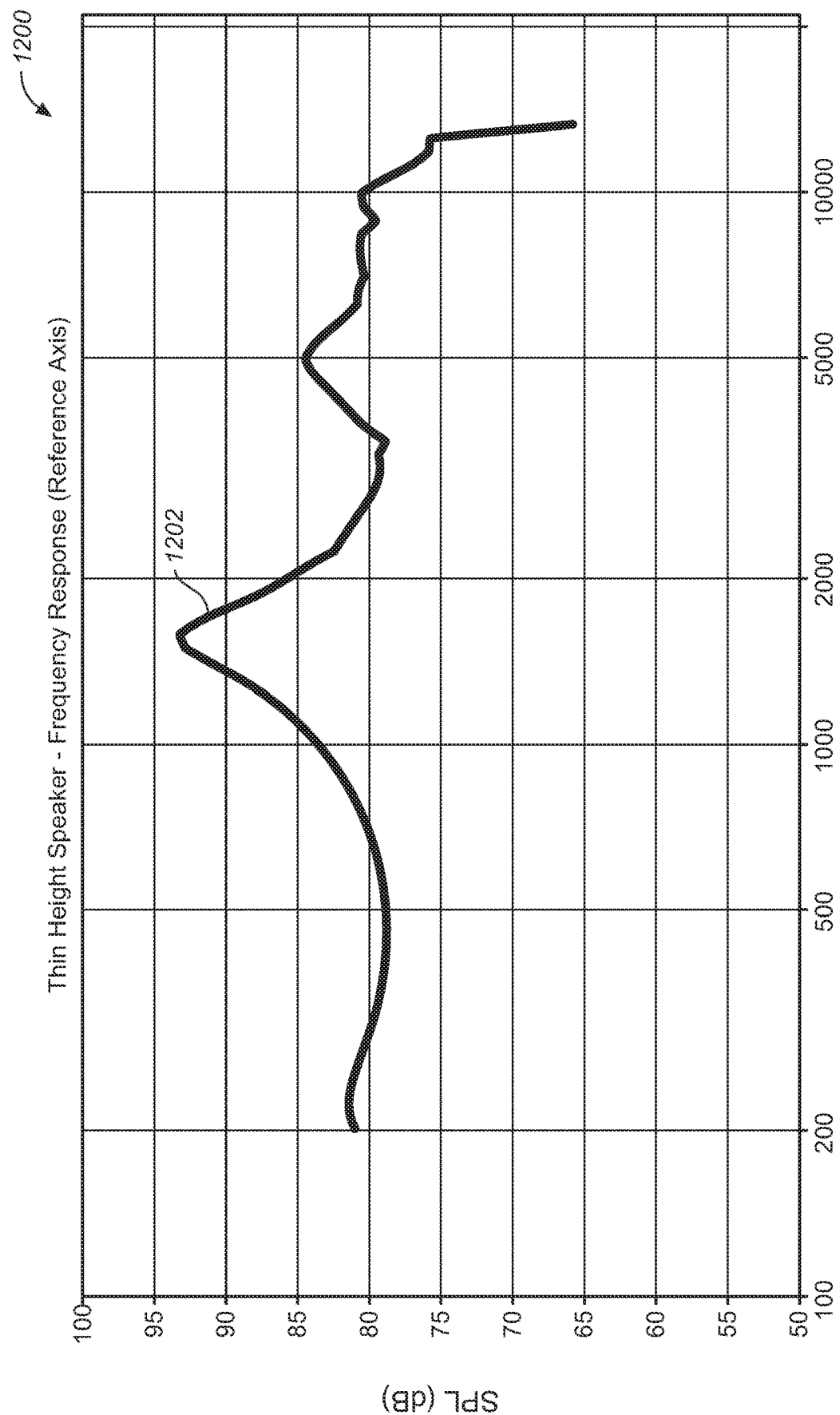
FIG. 12 illustrates an example amplitude response curve along a reference axis for a height speaker waveguide with an embedded acoustic reflector surface, under some embodiments.

FIG. 12 illustrates an example frequency response curve along a reference axis for a height speaker at a specified distance (e.g., 1 m), under some embodiments. The frequency response 1200 is plotted for sound pressure level (SPL) in dB across the operational frequency range, e.g., 200 to 14 kHz. As can be seen in the example plot 1202 of FIG. 12, there is a 12 dB resonant peak at 1.65 kHz in the frequency response. Embodiments include a resonator mechanism to equalize this resonant peak in-order to improve the sound quality of the height speaker using waveguide-based acoustic reflectors.

In an embodiment, a physical resonator is included with the acoustic reflector height channel speaker to mitigate resonant peaks, such as that shown in FIG. 12. The resonator works as an acoustic filter element which, when precisely tuned, mitigates the resonant response of the height speaker system. The resonator can be designed as either a Helmholtz resonator design or a quarter wave resonator, or similar design. The resonator is typically placed in the high-pressure regions within the reflector waveguide cavity (also called the front volume chamber of height speaker). Certain components of the resonator include the resonator volume, amount of acoustic damping material used to fill the resonator volume, and quality of the material, e.g., perforated mesh.

Figure 13:
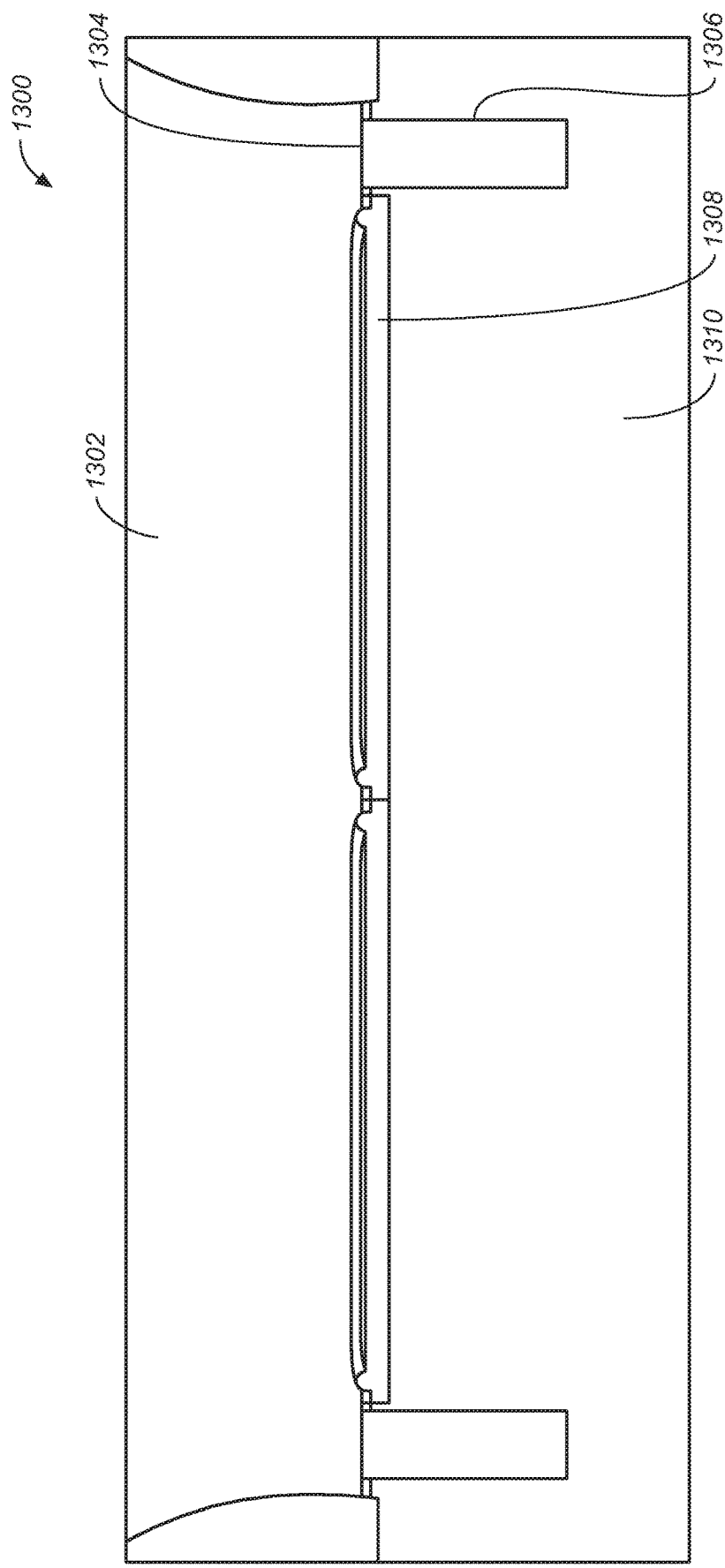
FIG. 13 illustrates a resonator design for front volume chamber of a height speaker, under some embodiments.

FIG. 13 illustrates a height speaker resonator, under some embodiments. The resonator is designed as a quarter wave resonator. The dimensions of such a resonator are configured to match that of the height speaker itself, and in example embodiment are on the order of 22 mm (length)×10 mm (width)×53 mm (depth). FIG. 13 illustrates a cutaway front view of a resonator 1300 having two transducers 1308 mounted in an inclined surface of cabinet 1310. The reflective waveguide portion 1302 formed by the front/back and side walls of the reflective walls creates a front volume chamber of speaker 1300. To reduce the amplitude amplification (acoustical resonance) created by the closed pipe, resonator slots or acoustic cavities 1304 are formed into the inclined surface holding the transducers 1308. The embodiment of FIG. 13 illustrates a quarter wave resonator design in which slots 1304 are quarter wave resonators with the opening 1304 covered with a perforated mesh (or equivalent material) and the resonator slot filled with a damping material 1306. The acoustic damping material 1306 is characterized by its flow resistivity (Rf) material property, such as on the order of 10,000 Pa·s per square meter, or similar value. Some common examples of acoustic damping material include rockwool, fiberglass, and so on. The resonator slot filled with damping material is covered with an acoustic mesh or grille component to provide additional acoustic resistance and mechanical support to keep the acoustic damping material intact during the lifetime of the speaker.

Instead of a quarter wave resonator, a different type of resonator design may be used, such as a Helmholtz resonator, which is a resonator that has a neck and volume element. Other appropriate types of resonators may also be used.

Figure 14:
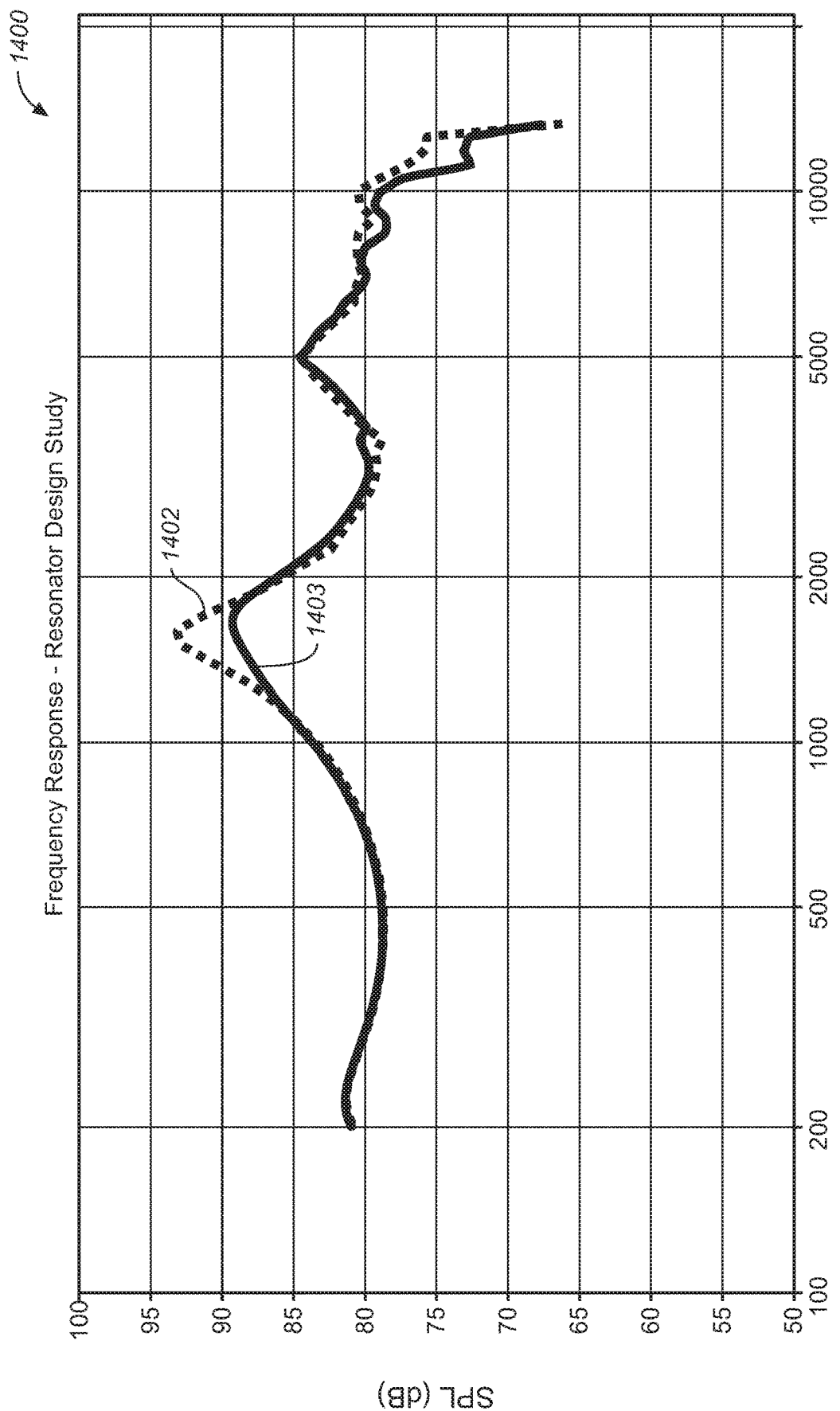
FIG. 14 illustrates the frequency response curve of FIG. 12 with a resonator, under some embodiments.

FIG. 14 illustrates the example frequency response curve of FIG. 12 with a resonator, under some embodiments. As shown in graph 1400, plot 1402 illustrates an example frequency response for the closed reflector height speaker without a resonator, and plot 1403 illustrates the frequency response when using a resonator slot with damping material and a perforated mesh, such as that of FIG. 13. As can be seen in FIG. 14, there is noticeable reduction in the resonant peak at 1.65 kHz of a certain SPL level, such on the order of 5 dB.

Although embodiments are described with respect to certain operating ranges and configurations of the resonator for use with the closed loop acoustic reflector height speaker, it should be noted that embodiments are not so limited and other operating ranges and configurations may also be used.

Besides height reflected sound directed to the ceiling of a room, the acoustic reflector structure for an occluded speaker can also be used to reflect sound against other surfaces, such as the wall or walls of the room. For this embodiment, the speakers modules are referred to as "side-reflection audio speakers," and are typically mounted on the side of a display or other surface of a playback device.

Figure 15A:
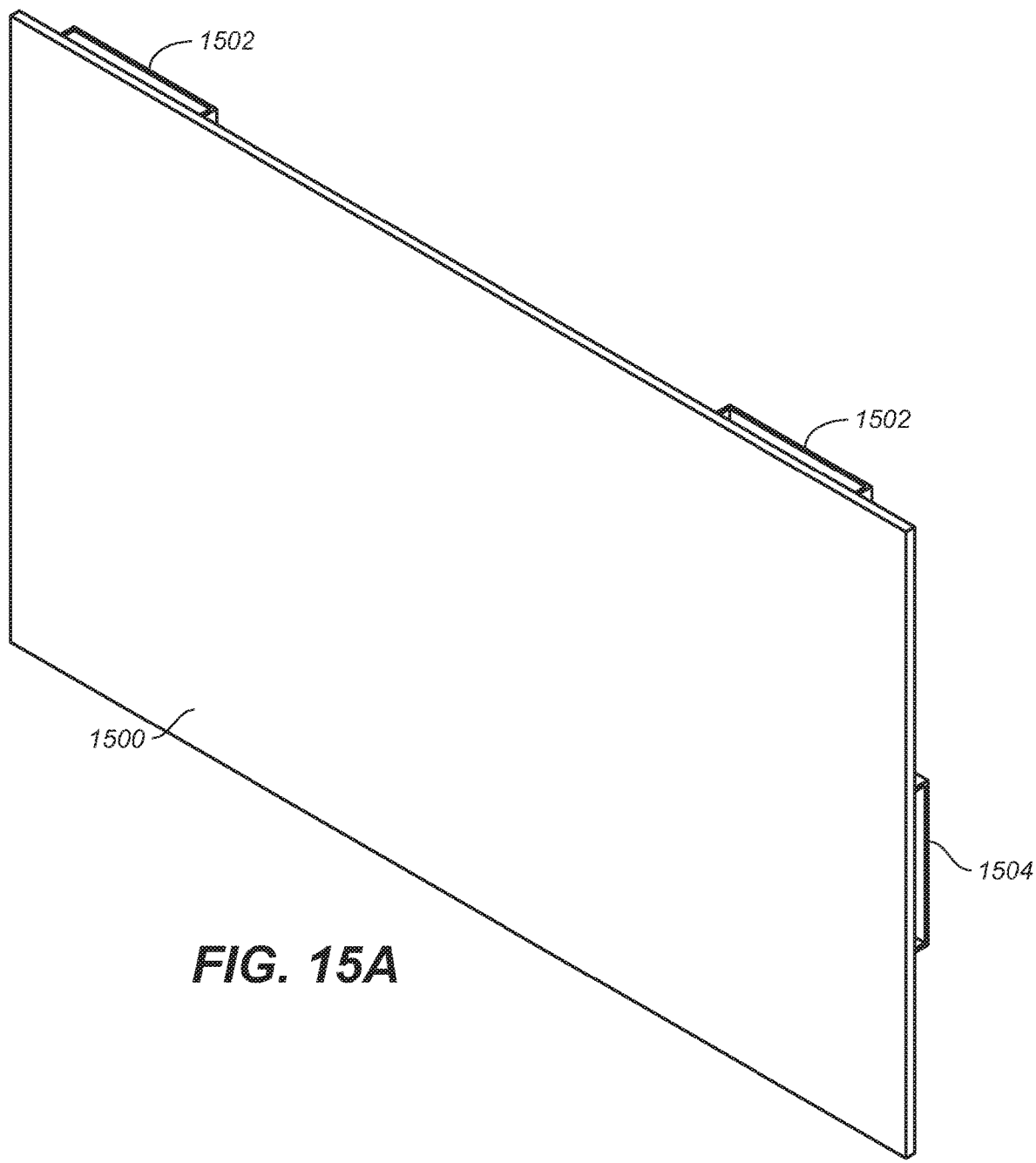
FIG. 15A is a front perspective view of a display panel with both height and side speakers having acoustic reflectors to direct sound off the ceiling and walls of a room, under some embodiments.

FIG. 15A is a front perspective view of a display panel with both height and side speakers having acoustic reflectors to direct sound off the ceiling and walls of a room, under some embodiments. As shown in FIG. 15A, display screen 1500 has a back side that has mounted upward-firing, acoustic reflection height speakers 1502, as well as side-firing side reflection speakers 1504. Due to the perspective view, only one side reflection speaker is 1504 is shown, however for symmetry and stereo or multi-channel audio, one side-reflection audio speaker per side may be provided.

Figure 15B:
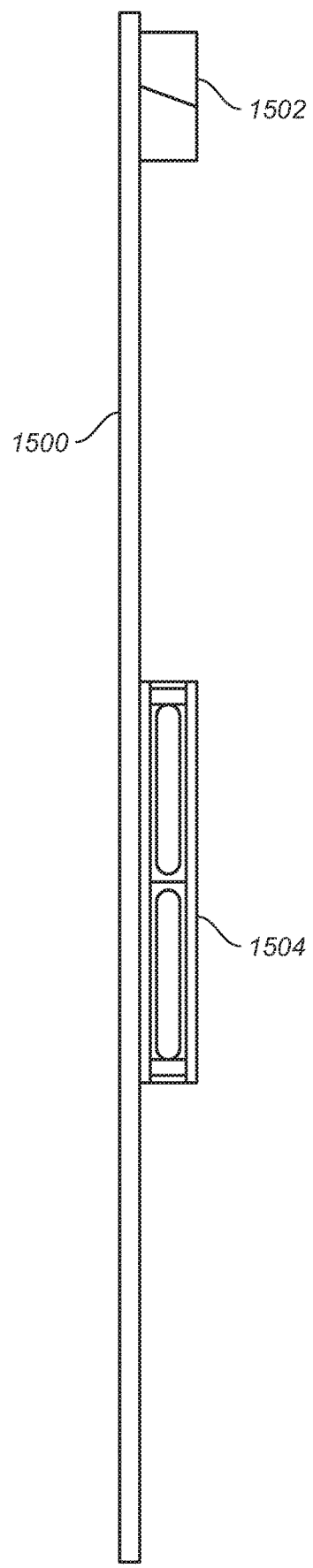
FIG. 15B is a side view of the display panel and speakers of FIG. 15A, under some embodiments.

FIG. 15B is a side view of the display panel and speakers of FIG. 15A, under some embodiments. As can be seen in FIG. 15B, the side-reflection audio speaker 1504 is positioned and configured to project sound directly out of the side of the display panel 1500 in a direction parallel the panel. Alternatively, this speaker or speakers may be positioned to project sound at an angle either behind or in front of the display panel depending on the position, distance, and configuration of the side walls or surfaces of the room in which the display panel is placed. In addition, more than one side-reflection audio speaker may be provided per side, such as in a linear array. Similarly, any number of height-speakers 1502 may be provided and installed along the top edge of display panel 1500.

In an embodiment, such as when the display is mounted or installed above ground, bottom-firing reflective speakers may be installed along the bottom edge of display panel 1500 to project sound downwards for reflection up from the floor of the room.

The side and/or bottom firing reflective speakers may be used to playback object-based or immersive audio that contains specific side or bottom audio channels or audio with side or bottom cues that reproduce sound sources meant to emanate below or on the side of the listener.

Embodiments of the acoustic reflector height channel speaker or side-firing speakers described herein may be used with any appropriate device or application, especially those requiring reduced thickness speakers. An example application for reduced thickness height speaker design is a television with immersive sound speakers. Such a TV may feature a very thin flat panel display thus requiring a speaker with less than 30 mm thickness. As the placement of such televisions is highly dependent on the end user, it generally better to design height speakers that provide their own sound reflections to recreate height components as opposed to speakers that use rear wall reflections.

Unless the context clearly requires otherwise, throughout the description and the claims, the words "comprise," "comprising," and the like are to be construed in an inclusive sense as opposed to an exclusive or exhaustive sense. Words using the singular or plural number also include the plural or singular number respectively. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not so limited. The description is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A height channel speaker for transmitting sound waves to be reflected off an upper surface of a listening environment, comprising:
   an enclosure having a first side and a second side joined by an inclined surface, wherein the first side has a lower vertical height than the second side;
   a transducer installed on the inclined surface and positioned to radiate acoustic energy along a radiant axis that is perpendicular to a plane defined by the inclined surface;
   an acoustic reflector attached to the lower side and configured to direct, shape, and focus the radiated acoustic energy to the upper surface of the listening environment; and
   a wall structure attached to the second side and extending above the enclosure substantially parallel to the acoustic reflector.

2. The speaker of claim 1, wherein the acoustic reflector comprises a planar structure extending above the first side and having an inner surface and an outer surface.

3. The speaker of claim 2 wherein the inner surface of the acoustic reflector is one of a flat, convex, or concave geometry with respect to the radiant axis of the transducer.

4. The speaker of claim 1, wherein the plane defined by the inclined surface has an inclination angle greater than 0 degrees and lower than 90 degrees from a floor plane of the listening environment.

5. The speaker of claim 3, wherein the inner surface of the acoustic reflector has the concave geometry and wherein an edge joining the inner surface and outer surface has a rounded profile.

6. The speaker of claim 1, wherein the inner surface of the acoustic reflector has the concave geometry and wherein the wall structure has an outer surface for attachment to a panel of an audio playback device, and a convex inner surface matching the concave geometry of the inner surface of the acoustic reflector.

7. The speaker of claim 1, wherein respective end sides of the acoustic reflector and wall structure are joined by respective end walls to form a shaped sound transmission column extending above the inclined surface.

8. The speaker of claim 7, wherein the shaped transmission column has a sound transmission opening directing the radiated sound to the upper surface of the listening environment, and further wherein a cross-sectional shape of the sound transmission opening is one of circular, rectangular, square, trapezoidal or elliptical.

9. The speaker of claim 7 further comprising one or more acoustical cavities cut into the inclined surface adjacent the transducer or one or more inner surfaces of the shaped sound transmission column to provide a resonator to mitigate resonant peaks introduced by a closed acoustic pipe effect of the shaped transmission column.

10. The speaker of claim 9, wherein the one or more slots are filled with an acoustic damping material and covered by a perforated mesh, and wherein the resonator comprises a quarter wave resonator or a Helmholtz resonator.

11. The speaker of claim 1, wherein the transducer is one of a single transducer or a plurality of transducers in an array, and further wherein the transducer is one of circular or rectangular in shape, and wherein the transducer is one of a tweeter, mid-range, or woofer driver.

12. A method of reflecting sound waves for immersive audio content having height cues from a ceiling of a listening environment, comprising:
   directing sound waves from a transducer of a speaker along a radiant axis to an acoustic reflector attached to the speaker, wherein the acoustic reflector and the transducer are mounted on an inclined plane such that the radiant axis of the transducer is directly incident on an inner surface of the acoustic reflector, wherein the acoustic reflector reflects, shapes and focuses sound radiation incident from the transducer towards the ceiling in a forward-upward-inclined direction to provide the height cues of the immersive audio content, wherein the speaker includes a first side and a second side joined by the inclined plane, wherein the first side has a lower vertical height than the second side, and wherein a barrier provides acoustic occlusion from a listener facing the second side such that direct sound transmission from the transducer to the listener is reduced.

13. The method of claim 12 wherein an inner surface of the acoustic reflector is one of a flat, convex, or concave geometry with respect to the radiant axis of the transducer, and wherein the inclined plane has a tilt angle greater than 0 degrees and lower than 90 degrees from a floor plane parallel the ceiling.

14. The method of claim 12, wherein the barrier includes a wall structure attached to the second side and extending above the second side substantially parallel to the acoustic reflector.

15. The method of claim 14, wherein the inner surface of the acoustic reflector has concave geometry and wherein the wall structure has a convex inner surface matching the concave geometry of the inner surface of the acoustic reflector.

16. The method of claim 12, wherein the barrier includes at least a portion of a panel of an audio playback device, and wherein the speaker is attached to a back side of the panel.

17. The method of claim 16, wherein the panel comprises a flat panel display screen, and the audio playback device comprises one of a television, a desktop computer, a portable computer, a table computer, a mobile phone, or a game console.

18. An arrangement comprising:
an audio playback device comprising a panel; and
a height channel speaker for transmitting sound waves to be reflected off an upper surface of a listening environment, the height channel speaker comprising:
an enclosure having a first side and a second side joined by an inclined surface, wherein the first side has a lower vertical height than the second side;
a transducer installed on the inclined surface and positioned to radiate acoustic energy along a radiant axis that is perpendicular to a plane defined by the inclined surface;
an acoustic reflector attached to the lower side and configured to direct, shape, and focus the radiated acoustic energy to the upper surface of the listening environment,
the second side of the enclosure of the height channel speaker being attached to a back side of the panel wherein at least a portion of the panel forms a barrier that provides acoustic occlusion from the listener facing a front side of the panel such that direct sound transmission from the transducer to the listener is reduced.

19. The arrangement of claim 18, wherein the panel comprises a flat panel display screen, and the audio playback device comprises one of a television, a desktop computer, a portable computer, a table computer, a mobile phone, or a game console.

* * * * *